United States Patent
Ezrielev et al.

(10) Patent No.: US 12,244,511 B2
(45) Date of Patent: Mar. 4, 2025

(54) SYSTEM AND METHOD FOR DATA REDUCTION BY DATA SEQUENCE ALIGNMENT

(71) Applicant: Dell Products L.P., Round Rock, TX (US)

(72) Inventors: Ofir Ezrielev, Be'er Sheva (IL); Jehuda Shemer, Kfar Saba (IL)

(73) Assignee: Dell Products L.P., Round Rock, TX (US)

( * ) Notice: Subject to any disclaimer, the term of this patent is extended or adjusted under 35 U.S.C. 154(b) by 420 days.

(21) Appl. No.: 17/726,284

(22) Filed: Apr. 21, 2022

(65) Prior Publication Data

US 2023/0344779 A1    Oct. 26, 2023

(51) Int. Cl.
*H04L 47/43* (2022.01)
*H04L 47/36* (2022.01)
*H04L 67/12* (2022.01)

(52) U.S. Cl.
CPC .......... *H04L 47/365* (2013.01); *H04L 67/12* (2013.01)

(58) Field of Classification Search
CPC .............................. H04L 47/365; H04L 67/12
See application file for complete search history.

(56) References Cited

U.S. PATENT DOCUMENTS

| | | | |
|---|---|---|---|
| 2005/0028056 A1* | 2/2005 | Tsao | G06F 11/1028 714/E11.046 |
| 2016/0026520 A1 | 1/2016 | Bouta et al. | |
| 2019/0044786 A1* | 2/2019 | Wouhaybi | H04L 67/12 |
| 2021/0376853 A1* | 12/2021 | De | G05B 19/056 |

OTHER PUBLICATIONS

Thompson, Julie D., Toby J. Gibson, and Des G. Higgins. "Multiple sequence alignment using ClustalW and ClustalX." Current protocols in bioinformatics 1 (2003): 2-3. https://currentprotocols.onlinelibrary.wiley.com/doi/abs/10.1002/0471250953.bi0203s00.
Manikandan, P., and D. Ramyachitra. "Bacterial foraging optimization-genetic algorithm for multiple sequence alignment with multi-objectives." Scientific reports 7.1 (2017): 1-14. https://www.nature.com/articles/s41598-017-09499-1.
(Continued)

*Primary Examiner* — Phuc H Tran
(74) *Attorney, Agent, or Firm* — Womble Bond Dickinson

(57) ABSTRACT

Methods and systems for managing data collection throughout a distributed environment are disclosed. To manage data collection, a system may include a data aggregator and a data collector. The data collector may utilize a consensus sequence to generate reduced-size data transmissions. The consensus sequence may be made up of patterns of data that occur frequently in data collected by the data collector. Therefore, data collected by the data collector may be condensed by replacing segments of the data with pointer pairs, pointer pairs being indicators of a portion of the consensus sequence that matches a segments of data. The data collector may transmit these pointer pairs, along with any additional segments of data, to the data aggregator instead of transmitting full data sets. The data aggregator may reconstruct data from the data collectors using the reduced-size data and the consensus sequence.

20 Claims, 16 Drawing Sheets

(56) References Cited

OTHER PUBLICATIONS

Ceze, Luis, Jeff Nivala, and Karin Strauss. "Molecular digital data storage using DNA." Nature Reviews Genetics 20.8 (2019): 456-466. https://www.nature.com/articles/s41576-019-0125-3.

Kumar, Manoj, et al. "Genetic algorithm: Review and application." Available at SSRN 3529843 (2010). https://papers.ssrn.com/sol3/papers.cfm?abstract_id=3529843.

Lewandowski, M.; Płaczek, B.; Bernas, M.; Classifier-Based Data Transmission Reduction in Wearable Sensor Network for Human Activity Monitoring. Sensors 2021, 21, 85. https://doi.org/10.3390/s21010085.

Le Borgne, Yann-Aël & Santini, Silvia & Bontempi, Gianluca. (2007). Adaptive model selection for time series prediction in wireless sensor networks. Signal Processing. 87. 3010-3020. 10.1016/j.sigpro.2007.05.015.

Ankur Jain, Edward Y. Chang, Yuan-Fang Wang; Adaptive stream resource management using Kalman Filters. SIGMOD '04: Proceedings of the 2004 ACM SIGMOD international conference on Management of data Jun. 2004 pp. 11-22 https://doi.org/10.1145/1007568.1007573.

X. Feng, X. Zhenzhen, Y. Lin, S. Weifeng and L. Mingchu, "Prediction-based data transmission for energy conservation in wireless body sensors," 2010 The 5th Annual ICST Wireless Internet Conference (WICON), 2010, pp. 1-9.

Tulone, Daniela & Madden, Samuel. (2006). An energy-efficient querying framework in sensor networks for detecting node similarities. 191-300. 10.1145/1164717.1164768.

Lu, Qing & Jiang, Weiwen & Xu, Xiaowei & Shi, Yiyu & Hu, Jingtong. (2019). On Neural Architecture Search for Resource-Constrained Hardware Platforms.

"Detecting data drift on data sets," Web page <https://docs.microsoft.com/en-us/azure/machine-learning/how-to-monitor-datasets?tabs=python>, Nov. 10, 2021, retrieved from Internet Archive Wayback Machine <https://web.archive.org/web/20210420083010/httpps://docs.microsoft.com/en-us/azure/machine-learning/how-to-monitor-datasets?tabs=python> on Apr. 27, 2022).

\* cited by examiner

SYSTEM AND METHOD FOR DATA REDUCTION BY DATA SEQUENCE ALIGNMENT

FIELD

Embodiments disclosed herein relate generally to data collection. More particularly, embodiments disclosed herein relate to systems and methods to limit the transmission of data over a communication system during data collection.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
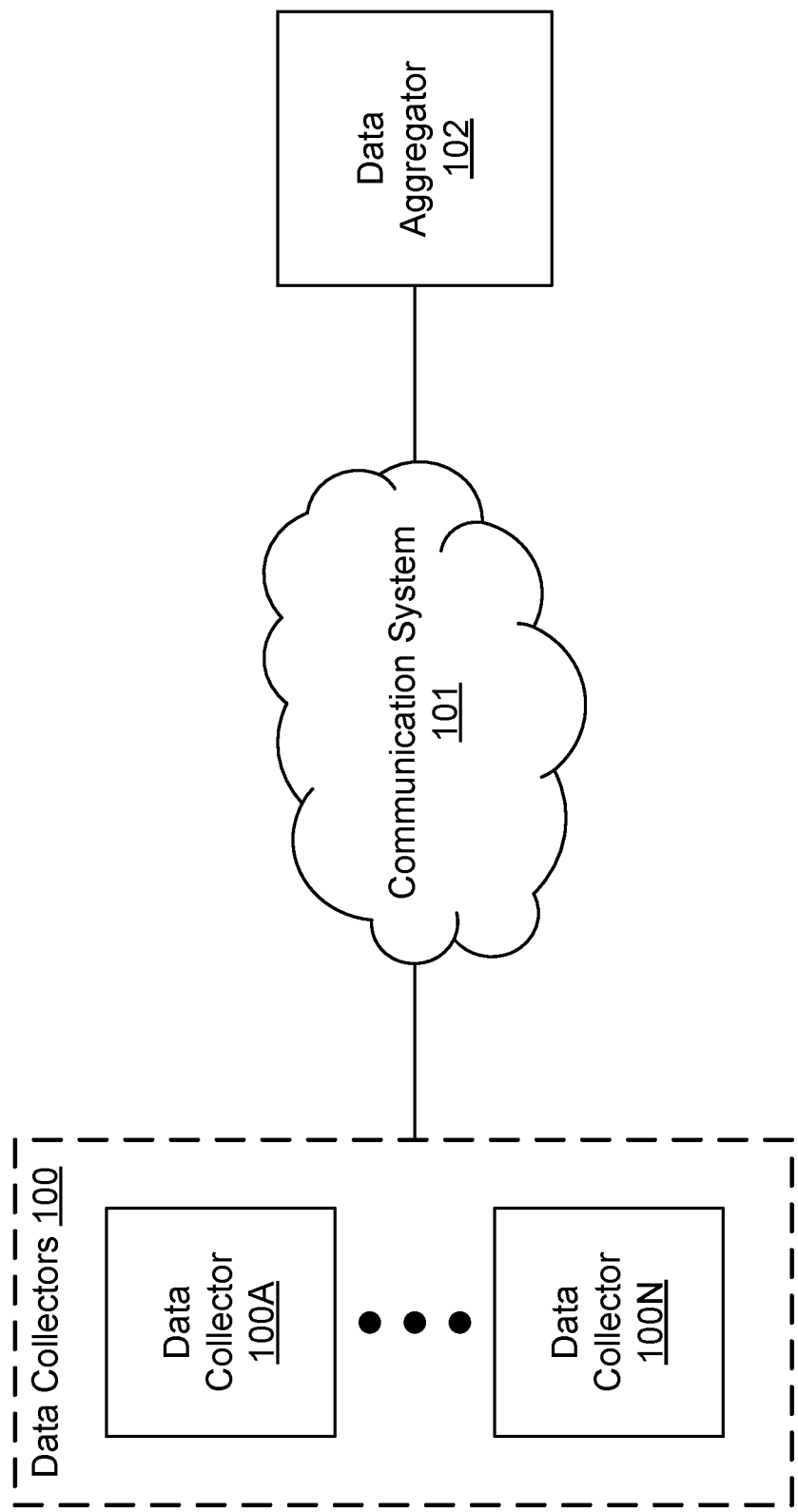
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for managing data collection in a distributed environment. To manage data collection, the system may include a data aggregator and a data collector. The data aggregator may obtain a consensus sequence, a consensus sequence being a representation of frequent patterns that may appear in a data set, in order to facilitate data reduction by the data collector.

The consensus sequence may be based on: (i) a consensus sequence generation data set obtained by the data aggregator and (ii) a compression matrix obtained via splitting the consensus sequence generation data into sub-sequences of data. The consensus sequence generation data may be data obtained by the data collector. The data collector may be any type of data collector including, for example, a temperature data collector, a pH data collector, a humidity data collector, etc. Therefore, the disclosed system may be broadly applicable to a wide variety of data collectors that may generate various types and quantities of measurements. The data aggregator may provide a copy of the consensus sequence to the data collector and, therefore, the data collector and the data aggregator may share the ability to reduce or reconstruct data using the consensus sequence.

To attempt to reduce data transmission, the data aggregator may obtain reduced-size data from the data collectors, reduced-size data being based on: (i) data obtained via measurements performed by the data collectors and (ii) the copy of the consensus sequence obtained from the data aggregator. The reduced-size data may contain fewer bits of information than the original data set and may include condensed representations of sub-sequences (e.g., segments) of data. The reduced-size data may be in a packaged (e.g., compressed) form and may require extraction by the data aggregator prior to data reconstruction.

The data aggregator may reconstruct data based on measurements performed by the data collectors using: (i) reduced-size data provided by the data collectors and (ii) the consensus sequence. The consensus sequence may be identical to the copy of the consensus sequence used by the data collectors to obtain the reduced-size data. Therefore, the data aggregator may access the exact measurements performed by the data collectors without measurements being transmitted over a communication system. Consequently, data transmission may be reduced, communication system bandwidth may be conserved, and power consumption of the devices may be reduced throughout the system.

In an embodiment, a method for managing data collection in a distributed environment where data is collected in a data aggregator of the distributed environment and from a data collector operably connected to the data aggregator via a communication system is provided.

The method may include obtaining, by the data aggregator, reduced-size data from the data collector, the reduced-size data being based on: data obtained via a measurement performed by the data collector, and a consensus sequence generated by the data aggregator; reconstructing, by the data aggregator, the data using the reduced-size data and the consensus sequence, the reconstructed data being intended to match the data obtained via the measurement performed by the data collector; and performing an action set based at least in part on the reconstructed data, the action set comprising one or more actions to be performed based on the data obtained by the measurement performed by the data collector, and while the data aggregator does not have access to the data obtained by the data collector.

The method may also include obtaining, by the data aggregator, a consensus sequence, the consensus sequence being based on: consensus sequence generation data obtained via measurements performed by the data collector, and a compression matrix obtained via splitting the consensus sequence generation data into sub-sequences of data.

Obtaining the reduced-size data may include receiving via a communication system a packaged form of the reduced-size data, the packaged form being compliant with a communication scheme employed by the communication system; and extracting the reduced-size data from the packaged form of the reduced-size data.

The packaged form of the reduced-size data is received via a capacity-constrained downlink of the communication system.

The method may also include obtaining, by the data aggregator, the consensus sequence and providing the consensus sequence to the data collector via an uplink of the communication system that is not capacity-constrained prior to the reduced-size data being obtained from the data collector.

Reconstructing the data using the reduced-size data and the consensus sequence may include determining, by the data aggregator, that the reduced-size data was generated using the consensus sequence; and based on the presumption, aggregating copies of portions of the consensus sequence together based on the consensus sequence to obtain the reconstructed data.

The consensus sequence generation data is obtained using a sensor that measures a characteristic of an ambient environment.

The data aggregator and data collector are separate devices that are geographically separated from one another and that operate independently from one another.

The method may also include updating the consensus sequence in response to a data reduction ratio of the reduced-size data falling below a threshold.

The method may also include updating the consensus sequence in response to measurements performed by the data collector drifting over time.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1, a block diagram illustrating a system in accordance with an embodiment is shown. The system shown in FIG. 1 may provide computer-implemented services that may utilize data aggregated from various sources throughout a distributed environment.

The system may include data aggregator 102. Data aggregator 102 may provide all, or a portion, of the computer-implemented services. For example, data aggregator 102 may provide computer-implemented services to users of data aggregator 102 and/or other computing devices operably connected to data aggregator 102. The computer-implemented services may include any type and quantity of services which may utilize, at least in part, data aggregated from a variety of sources (e.g., data collectors 100) within a distributed environment.

For example, data aggregator 102 may be used as part of a control system in which data that may be obtained by data collectors 100 is used to make control decisions. Data such as temperatures, pressures, etc. may be collected by data collectors 100 and aggregated by data aggregator 102. Data aggregator 102 may make control decisions for systems using the aggregated data. In an industrial environment, for example, data aggregator 102 may decide when to open and/or close valves using the aggregated data. Data aggregator 102 may be utilized in other types of environments without departing from embodiments disclosed herein.

To facilitate data collection, the system may include one or more data collectors 100. Data collectors 100 may include any number of data collectors (e.g., 100A-100N). For example, data collectors 100 may include one data collector (e.g., 100A) or multiple data collectors (e.g., 100A-100N) that may independently and/or cooperatively provide data collection services.

For example, all, or a portion, of data collectors 100 may provide data collection services to users and/or other computing devices operably connected to data collectors 100. The data collection services may include any type and quantity of services including, for example, temperature data collection, pH data collection, humidity data collection, etc. Different systems may provide similar and/or different data collection services.

To aggregate data from data collectors 100, some portion and/or representations of data collected by data collectors 100 may be transmitted across communication system 101 to data aggregator 102 (and/or other devices). The transmission of large quantities of data over communication system 101 may have undesirable effects on the communication system 101, data aggregator 102, and/or data collectors 100. For example, transmitting data across communication system 101 may consume network bandwidth and increase the energy consumption of data collectors 100 used for data transmission. Additionally, in some cases, it may be more desirable to transmit data in certain directions between components due to communication demands within the system.

In general, embodiments disclosed herein may provide methods, systems, and/or devices for managing data collection in a distributed environment. To manage data collection in a distributed environment, a system in accordance with an embodiment may limit the transmission of data between components of the system while ensuring that all components that need access to the data to provide their respective functions are likely to have access to accurate data (e.g., such as the data based on measurements performed by data collectors 100). By limiting the transmission of data, communication bandwidth of the system of FIG. 1 may be preserved, energy consumption for data transmission may be reduced, etc.

To limit the transmission of data, data collectors 100 may transmit only reduced-size data rather than the data itself unless explicitly instructed to do so by data aggregator 102. Reduced-size data may include sub-sequences (e.g., segments) of data and/or condensed representations of sub-sequences of data. The sub-sequences and condensed representations may undergo further reduction steps (e.g., data compression, data quantization, data discretization, etc.) to further reduce the size of data transmitted over communication system 101 and produce a packaged form of the reduced-size data.

To provide its functionality, data aggregator 102 may (i) prepare for reduced-size data transmission by obtaining a consensus sequence, a consensus sequence being a means for condensing sequences of data, and distributing this consensus sequence to data collectors 100, (ii) obtain reduced-size data from data collectors 100, reduced-size data being generated using the consensus sequence and data obtained via measurements performed by data collectors 100, (iii) reconstruct data from data collectors 100 using the reduced-size data and the consensus sequence, and (iv)

perform corrective action if needed to maintain a data reduction ratio above a threshold. By doing so, data aggregator 102 may perform data collection without obtaining (all of, or a portion thereof) data based on a series of measurements performed by data collectors 100 and, therefore, reduce data transmission.

Figure 3A:
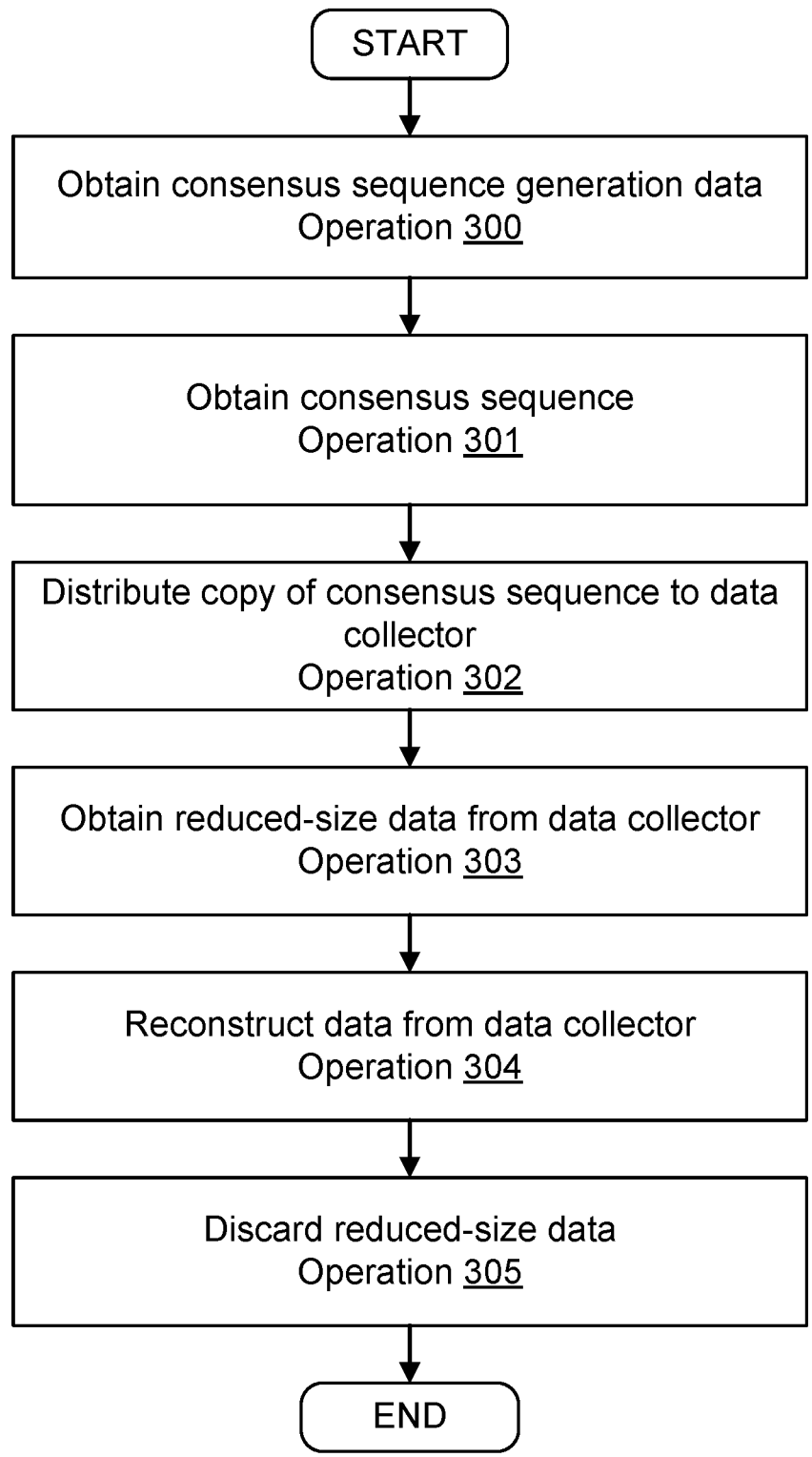
FIG. 3A shows a flow diagram illustrating a method of aggregating data in a distributed environment in accordance with an embodiment.
Figure 3B:
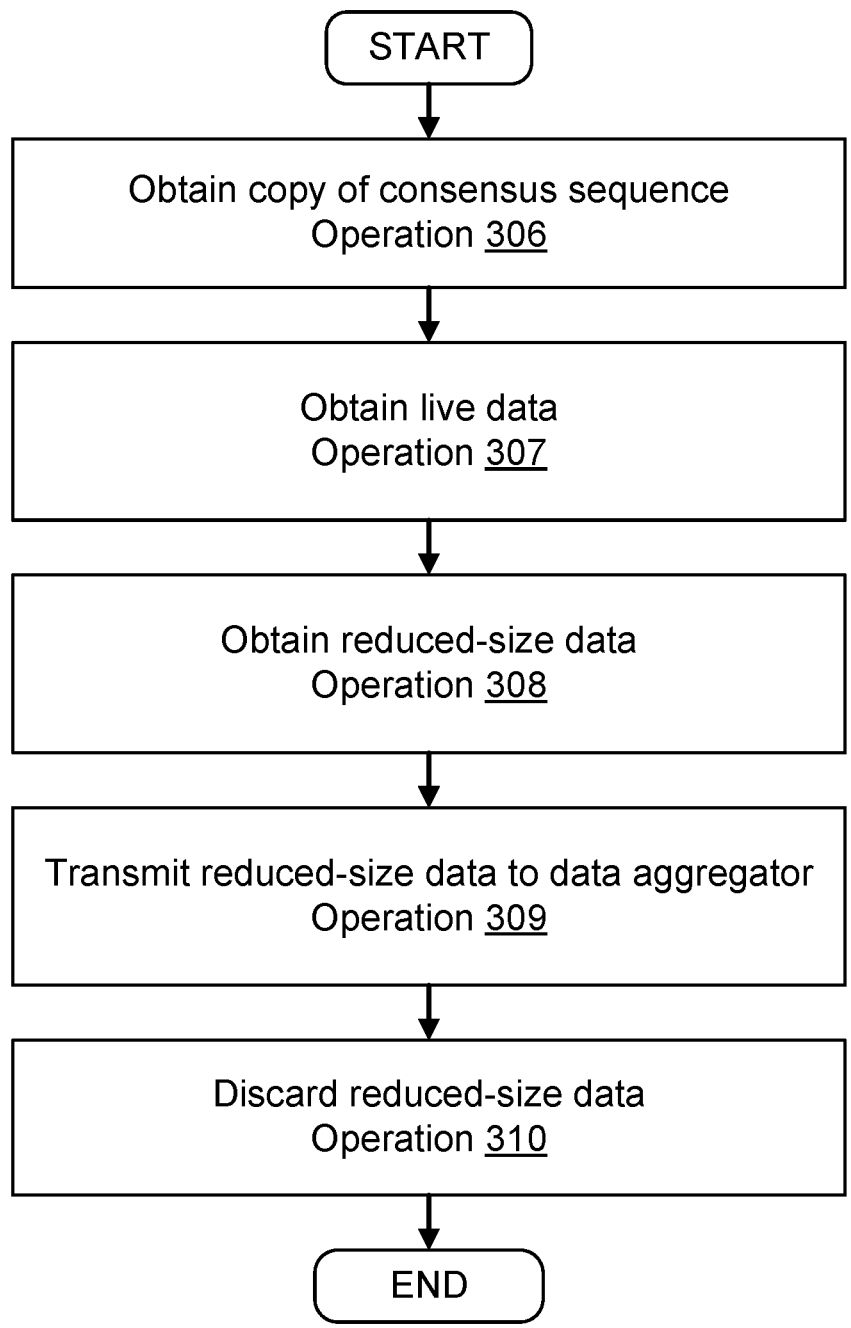
FIG. 3B shows a flow diagram illustrating a method of obtaining reduced-size data in accordance with an embodiment.
Figure 3C:
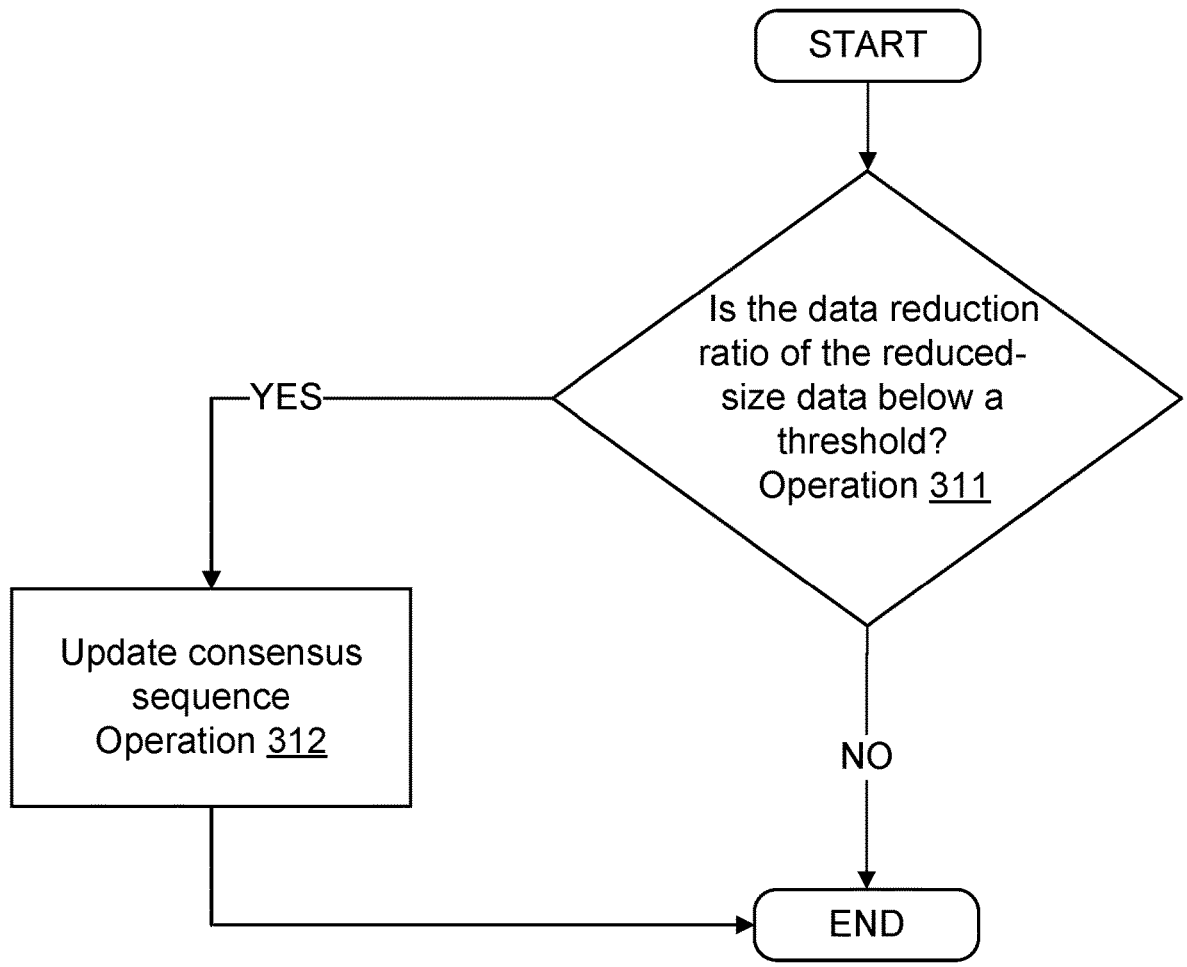
FIG. 3C shows a flow diagram illustrating a method of updating consensus sequences in accordance with an embodiment.

When performing its functionality, data aggregator 102 may perform all, or a portion, of the methods and/or actions shown in FIGS. 3A and 3C.

To provide its functionality, data collectors 100 may (i) obtain a consensus sequence from data aggregator 102, (ii) obtain reduced-size data using the consensus sequence and data obtained via measurements performed by data collectors 100, and (iii) transmit the reduced-size data to data aggregator 102. By doing so, data collectors 100 may transmit a reduced quantity of data to data aggregator 102 for aggregation purposes thereby reducing network bandwidth consumption and power consumption by the data collectors.

When performing its functionality, data collectors 100 may perform all, or a portion, of the methods and/or actions shown in FIGS. 3B-3C.

Reduced-size data may be based on measurements performed by data collectors 100 and/or any representation of data obtained by data collectors 100 and/or data aggregator 102. For example, reduced-size data may be based on a difference, a difference being a representation of the difference between data and an inference intended to match the data as described below.

In this scenario, identical copies of a trained twin inference model may be hosted by data aggregator 102 and data collectors 100 and, therefore, may generate identical inferences. Data aggregator 102 may obtain a consensus sequence, a consensus sequence intended to facilitate data reduction and may distribute a copy of the consensus sequence to data collectors 100. Data collectors 100 may obtain a difference based on: (i) data based on measurements performed by the data collectors and (ii) inferences generated by the copy of the twin inference model hosted by the data collectors. Data collectors 100 may generate a condensed (e.g., reduced-size) representation of the difference using the copy of the consensus sequence and the difference. Data collectors 100 may perform additional data reduction steps (e.g., data compression, etc.) to further decrease the size of data transmissions across communication system 101 and produce a packaged form of the reduced-size data.

Data aggregator 102 may obtain the reduced-size data from data collectors 100 and may reconstruct the difference using the consensus sequence. Data aggregator 102 may then reconstruct the data based on: (i) the difference and (ii) inferences generated by the copy of the twin inference model hosted by data aggregator 102. Consequently, full data sets may be obtained by data aggregator 102 without transmitting any data sets over communication system 101. By doing so, network bandwidth may be conserved and power consumption due to data transmission may be reduced throughout the distributed environment. A consensus sequence may be utilized to facilitate the reduction of data transmissions during data collection via other methods without departing from embodiments disclosed herein.

Data collectors 100 and/or data aggregator 102 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

In an embodiment, one or more of data collectors 100 are implemented using an internet of things (IoT) device, which may include a computing device. The IoT device may operate in accordance with a communication model and/or management model known to the data aggregator 102, other data collectors, and/or other devices.

Any of the components illustrated in FIG. 1 may be operably connected to each other (and/or components not illustrated) with a communication system 101. In an embodiment, communication system 101 includes one or more networks that facilitate communication between any number of components. The networks may include wired networks and/or wireless networks (e.g., and/or the Internet). The networks may operate in accordance with any number and types of communication protocols (e.g., such as the internet protocol).

In an embodiment, the system of FIG. 1 may utilize both uplink (e.g., data aggregator to data collector) and downlink (e.g., data collector to data aggregator) pathways to transmit information throughout the distributed environment. In order to limit data transmission, reduced-size data or representations of data may be transmitted rather than the data itself via these pathways. Further, to balance or improve the use of under-utilized pathways, consensus sequences and/or other data structures (e.g., inference models, etc.) may be provided to the data collectors via the uplink pathways. Transmitting data via under-utilized uplink pathways may allocate the load on the system to more available pathways and facilitate a reduction in data transmissions overall throughout distributed environments.

While illustrated in FIG. 1 as included a limited number of specific components, a system in accordance with an embodiment may include fewer, additional, and/or different components than those illustrated therein.

Figure 2A:
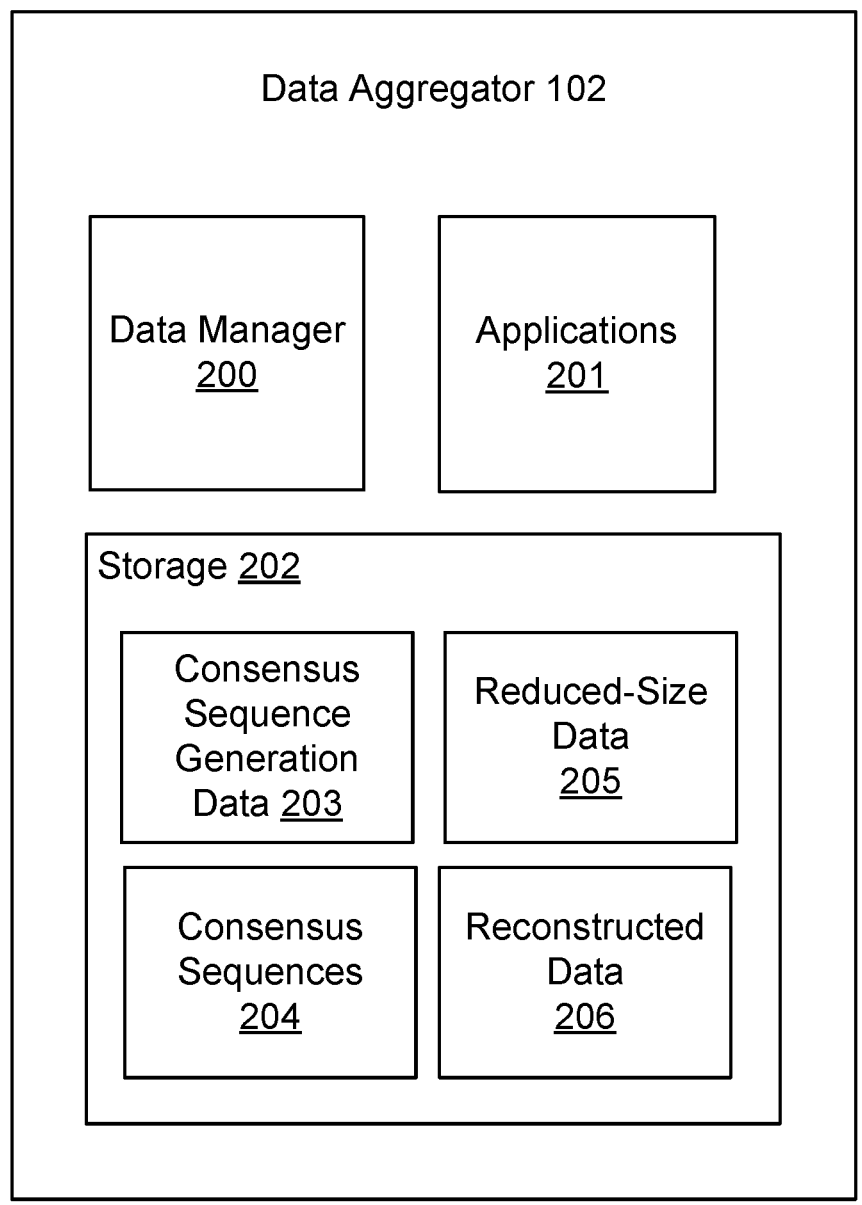
FIG. 2A shows a block diagram illustrating a data aggregator in accordance with an embodiment.

As discussed above, the system of FIG. 1 may include one or more data aggregators. Turning to FIG. 2A, a diagram of data aggregator 102 in accordance with an embodiment is shown. Data aggregator 102 may provide computer-implemented services that utilize data aggregated from various sources within a distributed environment. In order to do so, data aggregator 102 may utilize aggregated data without accessing (all of, or a portion thereof) data based on a series of measurements obtained by the sources (e.g., such as data collected by data collectors 100). By doing so, data transmission may be reduced and, therefore, communication bandwidth may be conserved. To provide its functionality, data aggregator 102 may include data manager 200, applications 201, and/or storage 202. Each of these components is discussed below.

Data manager 200 may (e.g., to provide all, or a portion, of the computer-implemented services): (i) obtain consensus sequence generation data, (ii) obtain one or more consensus sequences based on the consensus sequence generation data, (iii) distribute copies of one or more consensus sequences to sources throughout a distributed environment (e.g., data collectors 100), (iv) obtain reduced-size data from sources throughout a distributed environment, (v) reconstruct data based on measurements performed by sources throughout a distributed environment using the reduced-size data and the one or more consensus sequences, (vi) discard reduced-size data if no longer needed, (vii) determine if a data reduction ratio of the reduced-size data falls below a threshold, and (viii) perform corrective action if the data reduction ratio of the reduced-size data falls below a threshold.

In an embodiment, data manager 200 may obtain consensus sequence generation data from sources throughout a distributed environment (e.g., data collectors 100). Consensus sequence generation data may include any quantity and type of data. For example, consensus sequence generation data may include a series of measurements representing an ambient environment (e.g., temperature data, humidity data, pH data).

For example, the consensus sequence generation data may include a set of temperature measurements obtained via measurements performed by a temperature sensor in an industrial environment. The set of temperature measurements may be as follows: $T_1=15.5°$ C., $T_2=15.0°$ C., $T_3=14.5°$ C., $T_4=15.0°$ C., $T_5=15.5°$ C. This set of measurements may be represented by a sequence of letters, each letter corresponding to a number of bits. Therefore, the consensus sequence generation data set may be represented by the following sequence of letters: ABAACABDACCABBAC. This consensus sequence generation data may be utilized by data aggregator 102 to obtain a consensus sequence as described below.

In an embodiment, data manager 200 may obtain one or more consensus sequences, a consensus sequence being based on: (i) the consensus sequence generation data and (ii) a compression matrix obtained via splitting the consensus sequence generation data into sub-sequences of data. A consensus sequence may be used to obtain a condensed representation of data and, therefore, reduce the size of data transmissions during data collection. The generation of the consensus sequence may rely on identifying patterns within the consensus sequence generation data. For example, the consensus sequence generation data may be as follows: ABAACABDACCABBAC. In this sequence, each letter may represent a different number of bits and the entire sequence may represent the bits associated with a data set from a data collector.

Data manager 200 may feed the consensus sequence generation data into one or more splitting algorithms, which may split the consensus sequence generation data into smaller pieces (e.g., sub-sequences), each of identical length. These sub-sequences may be intended to have identical components when vertically aligned in a compression matrix. A compression matrix may include any number of rows and columns. The number of rows and columns in the compression matrix may be determined by data manager 200. Refer to FIG. 4B for an example of splitting and aligning sub-sequences in a compression matrix. Empty spaces may be added to the sub-sequences in order to properly align the sub-sequences in the compression matrix. Upon generation of the compression matrix, each column in the compression matrix may have either an empty space or an identical letter. The letter from each column of the compression matrix may be selected in order to determine the consensus sequence. Continuing with the above example, the consensus sequence may be ABACABDAC.

In an embodiment, sub-sequences of data may be aligned imperfectly (e.g., not all letters in a column being identical, which may result in imperfect reconstruction due to imperfect alignment) in the compression matrix. By doing so, some data may be eliminated in order to achieve more efficient compression (e.g., a lossy compression). In order to perform a lossy compression of data, errors may be maintained within a threshold, where some amount of data elimination may be acceptable and some amount may not. If the errors fall below a threshold, data compression may proceed. If errors fall outside the threshold, further splitting and aligning of sub-sequences may be required to achieve an acceptable amount of error during consensus sequence generation. The consensus sequence may be used by data collectors 100 to generate a reduced-size representation of data as described below.

In an embodiment, data manager 200 may distribute copies of one or more consensus sequences to sources throughout a distributed environment (e.g., data collectors 100). By doing so, both data collectors 100 and data aggregator 102 may have access to identical consensus sequences. Data collectors 100 may use the consensus sequences to generate reduced-size data based on measurements performed by the data collectors. The reduced-size data may undergo additional reduction steps in order to further reduce the size of the data transmission over communication system 101. By doing so, data collectors 100 may transmit the reduced-size data to data aggregator 102 and data aggregator 102 may reconstruct the data using an identical consensus sequence as described below. Refer to FIG. 4D for additional details regarding obtaining reduced-size data by data collectors 100.

In an embodiment, data manager 200 may obtain reduced-size data from sources (e.g., data collectors 100) throughout a distributed environment. Reduced-size data may be obtained in a packaged (e.g., compressed) form and may require extraction by data manager 200. Reduced-size data may be a condensed representation of a data set made up of pointer pairs and/or sub-sequences (e.g., segments) of data. Pointer pairs may represent a sub-sequence of data that matches at least a portion of the consensus sequence. For example, a pointer pair may be represented as P (0:2). In this pointer pair, the numbers may represent locations 0 and 2 in the consensus sequence ABACABDAC, where the first letter in the consensus sequence may be location 0 and the third letter in the consensus sequence may be location 2. Therefore, a sub-sequence of data represented by P (0:2) may be ABA. In another example, a data set may include a sub-sequence of data that does not match at least a portion of the consensus sequence. This sub-sequence may be ABC. Therefore, this sub-sequence of data may be included in the reduced-size data along with the pointer pairs in order to represent the entire data set. By transmitting the reduced-size data to data aggregator 102 instead of the full data set, data collectors 100 may transmit less data across communication system 101 and conserve power during operation. The reduced-size data may be used to reconstruct data based on measurements performed by data collectors 100 as described below.

In an embodiment, data manager 200 may reconstruct data based on measurements performed by data collectors 100 using the reduced-size data and one or more consensus sequences. As mentioned above, reduced-size data may include sub-sequences of data and pointer pairs. Pointer pairs may represent a sub-sequence of data and may consist numbers representing a starting location and an ending location on the consensus sequence. For example, data manager 200 may obtain the following pointer pair as part of the reduced-size data: P (2:5). This pointer pair indicates that there is a sub-sequence of data that begins at the second location in the consensus sequence and ends at the fifth location in the consensus sequence. The letters in the consensus sequence may be numbered zero through eight, with the first letter representing the 0 location and the last letter representing the 8 location. Therefore, the pointer pair P (2:5) may represent the sub-sequence of data ACAB given a consensus sequence of ABACABDAC. By reconstructing each pointer pair using the consensus sequence, data manager may reconstruct the data and/or representations of data transmitted by data collectors 100. By transmitting reduced-size data, communication bandwidth may be conserved and power consumption by the data collectors due to transmission may be reduced.

In an embodiment, data manager 200 may determine if the data reduction ratio of the reduced-size data falls below a threshold. The threshold may be any static or dynamic threshold, may be set by a user, and/or may be obtained from another entity through a communication system (e.g., communication system 101). For example, the threshold may be a ratio of 5:1, the ratio indicating that there should be a 5:1 ratio of total bits to reduced bits. This ratio may be monitored by data collectors 100 and/or data aggregator 102. Therefore, any reduced-size data transmitted to data aggregator 102 with a data reduction ratio lower than 5:1 may fall below the threshold (e.g., less efficient data compression). In contrast, any reduced-size data transmitted to data aggregator 102 with a data reduction ratio of 5:1 or higher may fall above the threshold (e.g., more efficient data compression). The threshold may be intended to maintain a data reduction rate throughout the distributed environment in order to minimize the amount of data transmitted over communication system 101 during data collection.

In an embodiment, data manager 200 may perform corrective action if the data reduction ratio of the reduced-size data falls below a threshold. For example, the reduced-size data obtained by data aggregator 102 may have a data reduction ratio of 3:1. Therefore, the data compression efficiency may be lower than the threshold of 5:1. This may indicate that the consensus sequence requires updating in order to optimize the efficiency of the data reduction process. In this scenario, data manager 200 may obtain a new consensus sequence using new consensus sequence generation data. The new consensus sequence generation data may include data based on measurements performed by data collectors 100, reconstructed data stored by data aggregator 102, and/or portions of previous versions of the consensus sequence generation data. The consensus sequence may be updated via other methods without departing from embodiments disclosed herein.

Applications 201 may consume data from reconstructed data 206 to provide computer-implemented services to users of data aggregator 102 and/or other computing devices operably connected to data aggregator 102. The computer-implemented services may include any type and quantity of services which may utilize, at least in part, data aggregated from a variety of sources (e.g., data collectors 100) within a distributed environment.

For example, applications 201 may use the aggregated data to modify industrial manufacturing processes; to sound alerts for undesired operation of systems, locations of persons in an environment; and/or for any other type of purpose. Consequently, applications 201 may perform various actions (e.g., action sets) based on the data in reconstructed data 206.

In an embodiment, one or more of data manager 200 and applications 201 is implemented using a hardware device including circuitry. The hardware device may be, for example, a digital signal processor, a field programmable gate array, or an application specific integrated circuit. The circuitry may be adapted to cause the hardware device to perform the functionality of data manager 200 and/or applications 201. One or more of data manager 200 and applications 201 may be implemented using other types of hardware devices without departing from embodiments disclosed herein.

In an embodiment, one or more of data manager 200 and applications 201 is implemented using a processor adapted to execute computing code stored on a persistent storage that when executed by the processor performs the functionality of data manager 200 and/or applications 201 discussed throughout this application. The processor may be a hardware processor including circuitry such as, for example, a central processing unit or a microcontroller. The processor may be other types of hardware devices for processing digital information without departing from embodiments disclosed herein.

When providing its functionality, data manager 200 and/or applications 201 may perform all, or a portion, of the operations and/or actions discussed with respect to FIGS. 3A and 3C.

When providing its functionality, data manager 200 and/or applications 201 may store data and use data stored in storage 202.

In an embodiment, storage 202 is implemented using physical devices that provide data storage services (e.g., storing data and providing copies of previously stored data). The devices that provide data storage services may include hardware devices and/or logical devices. For example, storage 202 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 202 may include a memory device (e.g., a dual in line memory device) in which data is stored and from which copies of previously stored data are provided. In another example, storage 202 may include a persistent storage device (e.g., a solid-state disk drive) in which data is stored and from which copies of previously stored data is provided. In a still further example, storage 202 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 202 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 202 may store data structures including, for example, consensus sequence generation data 203, consensus sequences 204, reduced-size data 205, and reconstructed data 206. Any of these data structures may be usable by components of the system in FIG. 1. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein. Each of these data structures is discussed below.

In an embodiment, consensus sequence generation data 203 may include a set of temperature measurements taken at different times in an industrial environment by one or more temperature sensors. Temperature sensors may collect a set of temperature measurements at different times over any period of time. For example, one temperature sensor may record the following data over the course of one hour: $T_1=36.5°$ C., $T_2=35.0°$ C., $T_3=35.5°$ C., $T_4=35.0°$ C., $T_5=36.0°$ C. These temperature measurements may be represented as a sequence of letters, with each letter representing a number of bits. For example, the temperature measurements may be represented by the following sequence of letters: BACDDABACABBDA. These temperature measurements and any representations of the temperature measurements may be temporarily or permanently stored by the temperature sensor and transmitted to a central temperature control system when requested for purposes of generating a consensus sequence to facilitate data reduction (and/or other purposes). Refer to FIG. 2A for additional details regarding consensus sequence generation data.

In an embodiment, consensus sequences 204 may include one or more consensus sequences. A consensus sequence may be a sequence of letters (and/or other representations) that represent patterns in data. Consensus sequences may be used to generate reduced-size representations of data and/or to reconstruct reduced-size representations of data. Refer to FIG. 2A for additional details regarding the generation of consensus sequences. Refer to FIG. 4B for an example of obtaining a consensus sequence.

In an embodiment, reduced-size data 205 may include any amount of reduced-size data obtained from sources (e.g., data collectors 100) throughout a distributed environment. Reduced-size data may include a sequence of pointer pairs and/or sub-sequences of data and may be obtained using: (i) data based on measurements performed by data collectors 100 and (ii) a consensus sequence provided by data aggregator 102 to data collectors 100. The consensus sequence used to obtain the reduced-size data may be generated by data aggregator 102 as described above. Pointer pairs may indicate how sub-sequences of data match at least a portion of the consensus sequence. By transmitting reduced-size data over communication system 101, network bandwidth may be conserved and power consumption by data collectors 100 may be reduced. Refer to FIG. 4D for additional details regarding the generation of reduced-size data.

In an embodiment, reconstructed data 206 may include any amount of reconstructed data obtained by data manager 200. Data based on measurements performed by data collectors (e.g., data collectors 100) may be reconstructed by data manager 200 without data manager 200 having access to the measurements performed by the data collectors. Data reconstruction may be performed using: (i) reduced-size data obtained by data aggregator 102 and (ii) a consensus sequence obtained by data aggregator 102 using consensus sequence generation data from consensus sequence generation data 203. Refer to FIG. 4F for additional details regarding the reconstruction of data by data aggregator 102.

While illustrated in FIG. 2A as including a limited number of specific components, a data aggregator in accordance with an embodiment may include fewer, additional, and/or different components than shown in FIG. 2A.

Figure 2B:
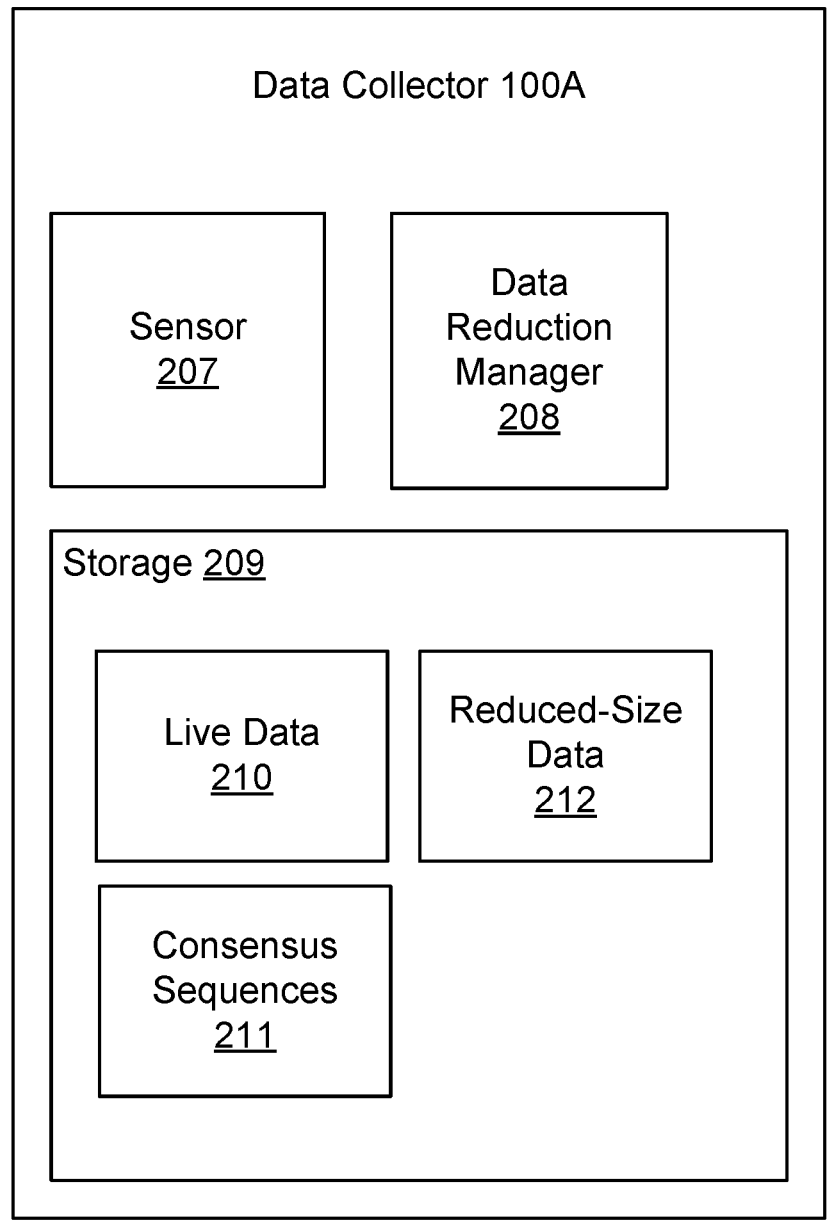
FIG. 2B shows a block diagram illustrating a data collector in accordance with an embodiment.

As discussed above, the system of FIG. 1 may include one or more data collectors (e.g., data collectors 100A-100N). Turning to FIG. 2B, a diagram of data collector 100A in accordance with an embodiment is shown. Any of data collectors 100 may be similar to data collector 100A. Data collector 100A may provide data collection services to users and/or other computing devices operably connected to data collector 100A. The data collection services may include any type and quantity of services including, for example, temperature data collection, pH data collection, humidity data collection, etc.

Following data collection, data collector 100A may generate reduced-size data using: (i) data obtained via a measurement performed by data collector 100A and (ii) a consensus sequence obtained by data collector 100A. The consensus sequence used to obtain the reduced-size data may represent frequently observed patterns in data based on measurements performed by data collector 100A. The reduced-size data may include: sequences of pointer pairs, pointer pairs being indicators of sub-sequences of data that match at least a portion of the consensus sequence and (ii) sub-sequences of data that may not match portions of the consensus sequence. Data collector 100A may transmit reduced-size data to data aggregator 102 instead of the data obtained via a measurement performed by data collector 100A. By doing so, the amount of data transmitted throughout a distributed environment may be reduced, which may lead to a reduction in communication bandwidth consumption and power consumption throughout the environment. The pointer pairs and/or sub-sequences of data may undergo a further data reduction step prior to transmission to further minimize the size of data transmissions throughout a distributed environment. To provide its functionality, data collector 100A may include sensor 207, data reduction manager 208, and/or storage 209. Each of these components is described below.

Sensor 207 may obtain a series of measurements representing a characteristic of an ambient environment. For example, sensor 207 may be a temperature sensor positioned in an industrial environment to obtain temperature measurements at various time intervals over the course of each hour. For example, sensor 207 may obtain the following series of measurements over the course of the first hour of data collection: $T_1=35.5°$ C., $T_2=35.0°$ C., $T_3=36.0°$ C., $T_4=36.0°$ C., $T_5=35.5°$ C. Sensor 207 may store at least a portion of these measurements in storage 209 (and/or other locations) as, for example, live data 210.

Data reduction manager 208 may (e.g., to provide all, or a portion, of the data collection services): (i) obtain a copy of one or more consensus sequences, (ii) obtain reduced-size data using data based on measurements performed by data collector 100A and one or more consensus sequences, (iii) transmit reduced-size data to data aggregator 102, (iv) discard the reduced-size data when no longer needed, and/or (v) respond to commands received from data aggregator 102 such as replacing or updating one or more consensus sequences.

In an embodiment, data reduction manager 208 may obtain copies of one or more consensus sequences from data aggregator 102 and/or other sources. Data aggregator 102 and data collector 100A may both have access to identical copies of one or more consensus sequences and may, therefore, be able to condense or reconstruct data by aligning the data to the consensus sequence. Refer to FIG. 2A for additional details regarding obtaining consensus sequences. Refer to FIG. 4B for an example of obtaining a consensus sequence.

In an embodiment, data reduction manager 208 may obtain reduced-size data using data based on measurements performed by data collector 100A and one or more consensus sequences. Reduced-size data may be a condensed representation of data from data collector 100A containing fewer bits of information than the original data. Reduced-size data may include pointer pairs and/or sub-sequences of data. Pointer pairs may indicate how sub-sequences of data (e.g., segments of the full data set) may match at least a portion of the consensus sequence. Refer to FIG. 2A for additional details regarding obtaining reduced-size data. Refer to FIG. 4D for an example of obtaining reduced-size data.

In an embodiment, data reduction manager 208 may transmit reduced-size data to data aggregator 102. Data reduction manager 208 may perform additional data reduction (e.g., data compression, data quantization, data discretization, etc.) to obtain a packaged form of the reduced-size data prior to data transmission. Data reduction manager 208 may transmit the packaged form of the reduced-size data at time intervals designated by a user and/or another entity through a communication system (e.g., communication system 101). For example, data reduction manager 208 may transmit the packaged form of the reduced-size data to data aggregator 102 once every hour.

In an embodiment, data reduction manager 208 may respond to commands from data aggregator 102. In a first scenario, data aggregator 102 may request reduced-size data at specific time intervals from data reduction manager 208. In a second scenario, data aggregator 102 may also request at least a portion of a series of measurements from data collector 100A for purposes of updating consensus sequences (and/or other purposes).

In an embodiment, one or more of sensor 207 and data reduction manager 208 is implemented using a hardware device including circuitry. The hardware device may be, for example, a digital signal processor, a field programmable gate array, or an application specific integrated circuit. The circuitry may be adapted to cause the hardware device to perform the functionality of sensor 207 and/or data reduction manager 208. One or more of sensor 207 and data reduction manager 208 may be implemented using other types of hardware devices without departing from embodiments disclosed herein.

In an embodiment, one or more of sensor 207 and data reduction manager 208 is implemented using a processor adapted to execute computing code stored on a persistent storage that when executed by the processor performs the functionality of sensor 207 and/or data reduction manager 208 discussed throughout this application. The processor may be a hardware processor including circuitry such as, for example, a central processing unit or a microcontroller. The processor may be other types of hardware devices for processing digital information without departing from embodiments disclosed herein.

In an embodiment, sensor 207 and/or data reduction manager 208 may utilize a physical device (e.g., a sensor) used to measure a characteristic of an ambient environment in order to perform the functionality of sensor 207 and/or data reduction manager 208. For example, a temperature sensor may utilize one or more thermistors, thermocouples, and/or resistance temperature detectors to collect temperature data. In a second example, a pH sensor may utilize any number of electrodes to collect pH data. The sensor may include other types of hardware devices for measuring a characteristic of an ambient environment without departing from embodiments disclosed herein.

When providing their functionality, sensor 207 and data reduction manager 208 may perform all, or a portion, of the operations and/or actions discussed with respect to FIGS. 3B-3C.

When providing its functionality, data reduction manager 208 may store data and use data stored in storage 209.

In an embodiment, storage 209 is implemented using physical devices that provide data storage services (e.g., storing data and providing copies of previously stored data). The devices that provide data storage services may include hardware devices and/or logical devices. For example, storage 209 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 209 may include a memory device (e.g., a dual in line memory device) in which data is stored and from which copies of previously stored data are provided. In another example, storage 209 may include a persistent storage device (e.g., a solid-state disk drive) in which data is stored and from which copies of previously stored data is provided. In a still further example, storage 209 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 209 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 209 may store data structures including, for example, live data 210, consensus sequences 211, and reduced-size data 212. Any of these data structures may be usable by components of the system in FIG. 1. Any of these data structures may be implemented using, for example, lists, tables, databases, linked lists, and/or other type of data structures. Any of the data structures may be shared, spanned across multiple devices, and may be maintained and used by any number of entities. Additionally, while illustrated as including a limited amount of specific data, any of these data structures may include additional, less, and/or different data without departing from embodiments disclosed herein. Each of these data structures is discussed below.

In an embodiment, live data 210 may include live data measurements collected by sensor 207. For example, live data 210 may include temperature measurements recorded by a temperature sensor at various time intervals. A series of temperature measurements may include the following five measurements taken over the course of one hour: $T_1=5.5°$ C., $T_2=5.0°$ C., $T_3=5.0°$ C., $T_4=5.1°$ C., $T_5=5.2°$ C. Any amount of measurements may be stored temporarily and/or permanently in live data 210 (and/or other locations). For example, some measurements may be removed while others may be added. Consequently, the contents of live data 210 may be updated over time to reflect more recent activity of data reduction manager 208.

In an embodiment, consensus sequences 211 may include copies of one or more consensus sequences obtained from data aggregator 102. Consensus sequences may be a sequence of letters (and/or other representations) that represent patterns in data. Consensus sequences may be used to generate reduced-size representations of data and/or to reconstruct reduced-size representations of data. Refer to FIG. 2A for additional details regarding the generation of consensus sequences. Refer to FIG. 4B for an example of obtaining a consensus sequence.

In an embodiment, reduced-size data 212 may include any amount of reduced-size data obtained by data collector 100A. Reduced-size data may include pointer pairs and/or sub-sequences of data and may be obtained using: (i) data based on measurements performed by data collector 100A and (ii) a consensus sequence provided by data aggregator 102. The consensus sequence used to obtain the reduced-size data may be generated by data aggregator 102 as described above. Pointer pairs may indicate how sub-sequences of data match at least a portion of the consensus sequence. Reduced-size data 212 may include packaged forms (e.g., compressed forms) of reduced-size data and/or unpackaged forms. By transmitting reduced-size data over communication system 101, network bandwidth may be conserved and power consumption by data collectors 100 may be reduced. Refer to FIG. 2A for additional details regarding the generation of reduced-size data. Refer to FIG. 4D for an example of the generation of reduced-size data.

While illustrated in FIG. 2B as including a limited number of specific components, a data collector in accordance with an embodiment may include fewer, additional, and/or different components than shown in FIG. 2B.

As discussed above, the components of FIG. 1 may perform various methods to utilize data aggregated from various sources throughout a distributed environment. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of aggregating data in a distributed environment in accordance with an embodiment is shown.

At operation 300, consensus sequence generation data may be obtained by data aggregator 102 from sources (e.g., data collectors 100) throughout a distributed environment. Consensus sequence generation data may include any quantity and type of data. For example, consensus sequence generation data may include a series of measurements representing an ambient environment (e.g., temperature data, humidity data, pH data). The consensus sequence generation data may be intended to serve as a representation of a typical data set obtained via measurements performed by data collectors 100.

In an embodiment, the consensus sequence generation data may be obtained from any number of data collectors (e.g., data collectors 100) throughout a distributed environment. For example, requests for the consensus sequence generation data may be sent to the data collectors and the data collectors may provide the consensus sequence generation data to the data aggregator in response to the requests. Such messages and/or data may be passed via a communication system operably connecting the data collector and the data aggregator.

In an embodiment, the consensus sequence generation data may be provided by another entity through a communication system. For example, the consensus sequence generation data may be obtained by data collectors throughout a second distributed environment with a similar environment. This consensus sequence generation data may be provided to any number of data aggregators in any number of distributed environments.

At operation 301, data aggregator 102 may obtain any number of consensus sequences. A consensus sequence may be a sequence of letters (and/or other representations) that represent patterns in data. Consensus sequences may be used to generate reduced-size representations of data and/or to reconstruct data from reduced-size representations of data. Refer to FIG. 2A for additional details regarding the generation of consensus sequences. Refer to FIG. 4B for an example of obtaining a consensus sequence.

In an embodiment, the consensus sequence may be obtained by the data aggregator using consensus sequence generation data. The consensus sequence generation data may be fed into one or more splitting algorithms to obtain a compression matrix and the consensus sequence may be derived from this compression matrix.

In an embodiment, the consensus sequence may also be obtained from another entity through a communication system (e.g., communication system 101). In this scenario, the consensus sequence obtained via another entity may or may not require updating by data aggregator 102. In one example, the consensus sequence may be generated by sources (e.g., data collectors 100) throughout the distributed environment if the sources have sufficient computing resources. In this scenario, data aggregator 102 may obtain copies of consensus sequences from data collectors 100.

At operation 302, data aggregator 102 may distribute a copy of one or more consensus sequences to sources (e.g., data collectors 100) throughout a distributed environment. Each copy of the consensus sequence may allow a device (e.g., a data collector and/or data aggregator) to share the ability to condense or reconstruct data based on the patterns of data found in the consensus sequence with any other device that has access to the consensus sequence.

In an embodiment, the copy of the consensus sequence may be distributed by data aggregator 102 to data collectors 100 throughout the distributed environment via a communication system (e.g., communication system 101). For example, a copy of the consensus sequence may be distributed to various data collectors by data aggregator 102 as part of the process of setting up a new distributed environment for data collection (and/or other purposes). In addition, a copy of the consensus sequence may be distributed to various data collectors by data aggregator 102 as part of the process of adding or replacing one or more data collectors in a distributed environment.

In an embodiment, data aggregator 102 may distribute a copy of one or more consensus sequences to data collectors 100 in order to take advantage of the under-utilized uplink pathways available throughout the distributed environment. By distributing some of the load on the system to these uplink pathways, data collection may be facilitated while avoiding congested data transmission pathways.

At operation 303, data aggregator 102 may obtain reduced-size data from data collectors 100. Reduced-size data may be obtained in a packaged (e.g., compressed) form and may require extraction by data aggregator 102. Reduced-size data may be a condensed representation of a data set made up of pointer pairs and/or sub-sequences (e.g., segments) of data. Pointer pairs may represent a sub-sequence of data that matches at least a portion of the consensus sequence. By transmitting reduced-size data during data collection, data aggregator 102 may access measurements performed by data collectors 100 without data collectors 100 transmitting full data sets across communication system 101. Consequently, network bandwidth may be conserved and power consumption by data collectors 100 due to data transmission may be reduced. Refer to FIG. 2A for additional details regarding obtaining reduced-size data. Refer to FIG. 4D for an example of reduced-size data generation.

In an embodiment, data collectors 100 may be programmed to provide reduced-size data at established time intervals, at varying time intervals, and/or via other modalities. For example, the data collectors 100 may be programmed to provide reduced-size data once every minute, every hour, every day, etc. The reduced-size data may be used by data aggregator 102 to reconstruct data obtained via measurements performed by data collectors 100 as described below.

At operation 304, data aggregator 102 may reconstruct data based on measurements performed by data collectors 100 using: (i) reduced-size data obtained from data collectors 100 and (ii) the consensus sequence. By reconstructing data from data collectors 100, data aggregator 102 may be able to obtain exact (or substantially similar) measurements from data collectors 100 without exchanging the measurements over communication system 101. By doing so, network bandwidth may be conserved and power consumption due to data transmission may be reduced throughout the distributed environment. Refer to FIG. 2A for additional details regarding the reconstruction of data. Refer to FIG. 4F for an example of data reconstruction.

At operation 305, reduced-size data may be discarded. Reduced-size data (and/or packaged copies of reduced-size data) may be discarded by data aggregator 102 following the process of data reconstruction in order to reduce storage consumption by data aggregator 102.

The method may end following operation 305.

Turning to FIG. 3B, a flow diagram illustrating a method of obtaining reduced-size data in accordance with an embodiment is shown.

At operation 306, data collectors 100 may obtain a copy of one or more consensus sequences from data aggregator 102. Each copy of the consensus sequence may allow a device (e.g., a data collector and/or data aggregator) to share the ability to condense or reconstruct data based on the patterns of data found in the consensus sequence with any other device that has access to the consensus sequence.

In an embodiment, the copy of the consensus sequence may be obtained from data aggregator 102 via a communication system (e.g., communication system 101). In a second scenario, the copy of the consensus sequence may be obtained from another entity (e.g., a second data aggregator) operably connected to the data collector via a communication system.

In an embodiment, data collectors 100 may generate a consensus sequence rather than obtaining it from another entity. In this scenario, data collectors 100 may utilize increased computational overhead in order to perform this operation. Refer to FIG. 2A for additional details regarding the generation of consensus sequences. Refer to FIG. 4B for an example of obtaining a consensus sequence.

At operation 307, data collectors 100 may obtain live data. The live data may be based on measurements performed by the data collectors. The live data may represent some characteristic of an ambient environment. The live data may be any type or quantity of data including, for example, temperature data, pH data, humidity data, etc. The live data may be obtained by the data collector continuously, at established time intervals, and/or via other modalities.

At operation 308, data collectors 100 may obtain reduced-size data. Reduced-size data may be a condensed (e.g., fewer bit) representation of data based on measurements performed by a data collector. Reduced-size data may include pointer pairs and/or sub-sequences of data (e.g., segments of data). Pointer pairs may represent sub-sequences of data and may indicate how these sub-sequences of data match at least a portion of the consensus sequence. Reduced-size data may undergo additional reduction operations (e.g., data compression, data quantization, data discretization) in order to further reduce the quantity of data used to convey information and produce a packaged form of the reduced-size data. Refer to FIG. 2A for additional details regarding obtaining reduced-size data. Refer to FIG. 4D for an example of reduced-size data generation.

At operation 309, data collectors 100 may transmit reduced-size data to data aggregator 102. Any amount of reduced-size data may be transmitted by data collectors 100 to data aggregator 102. For example, requests for the reduced-size data may be received by a data collector and the data collector may provide the reduced-size data to data aggregator 102 in response to the requests. Such messages and/or data may be passed via a communication system operably connecting the data collector and the data aggregator.

In an embodiment, reduced-size data may be provided by data collectors 100 to data aggregator 102. The data collectors may be programmed to provide reduced-size data at established time intervals or other modalities, as noted above. For example, the data collectors may be programmed to provide reduced-size data once every minute. By doing so, the amount of data transmitted via the communication system may be minimized and, therefore, the consumption of network bandwidth and consumption of power by the data collector for transmission purposes may be reduced.

At operation 310, reduced-size data may be discarded. Data collectors 100 may discard reduced-size data (and/or packaged forms of reduced-size data) following transmission of reduced-size data to data aggregator 102. In a second scenario, data collectors 100 may discard the reduced-size data upon receiving a command from data aggregator 102. Discarding the reduced-size data may reduce storage consumption by data collectors 100.

The method may end following operation 310.

Turning to FIG. 3C, a flow diagram illustrating a method of updating consensus sequences in accordance with an embodiment is shown.

At operation 311, data aggregator 102 and/or data collectors 100 may determine whether the data reduction ratio of the reduced-size data falls below a threshold. The threshold may be any static or dynamic threshold, may be set by a user, and/or may be obtained from another entity through a communication system (e.g., communication system 101). The threshold may be intended to maintain a data reduction rate throughout the distributed environment in order to minimize the amount of data transmitted over communication system 101 during data collection. Refer to FIG. 2A for additional details regarding data reduction thresholds. Refer to FIGS. 4G-4I for an example of how data reduction ratio thresholds may be monitored.

In an embodiment, data aggregator 102 and/or data collectors 100 may determine that the data reduction ratio is above the threshold. In this scenario, sufficient data reduction efficiency may be maintained throughout the distributed environment and the method may end following operation 311. If the data reduction ratio falls below the threshold, the method may proceed to operation 312.

At operation 312, data aggregator 102 and/or data collectors 100 may determine that the data reduction ratio falls below the threshold. In this scenario, the consensus sequence may be updated. The consensus sequence may be updated in order to allow data collectors 100 to generate reduced-size data containing fewer bits of information using the consensus sequence. The consensus sequence may be updated using a second set of consensus sequence generation data. The second set of consensus sequence generation data may be obtained from data based on measurements performed by the data collectors, reconstructed data from storage 202, and/or previous consensus sequence generation data from storage 202. The second set of consensus sequence generation data may be obtained via other methods without departing from embodiments disclosed herein.

The method may end following operation 312.

Turning to FIGS. 4A-4I, these figures may illustrate a system similar to that of FIG. 1 in accordance with an embodiment. FIGS. 4A-4I may show actions performed by the system over time. The system may include potential of hydrogen (pH) sensor 400 and water quality monitoring system 401. pH sensor 400 may be operably connected to water quality monitoring system 401 via communication system 101. Communication system 101 may include limited communication bandwidth and may serve a large number of different components (not shown). Consequently, it may be desirable to limit communications between pH sensor 400 and water quality monitoring system 401 to efficiently marshal the limited communication bandwidth so that it is less likely that components of the system are impaired for lack of access to communication bandwidth.

Figure 4A:
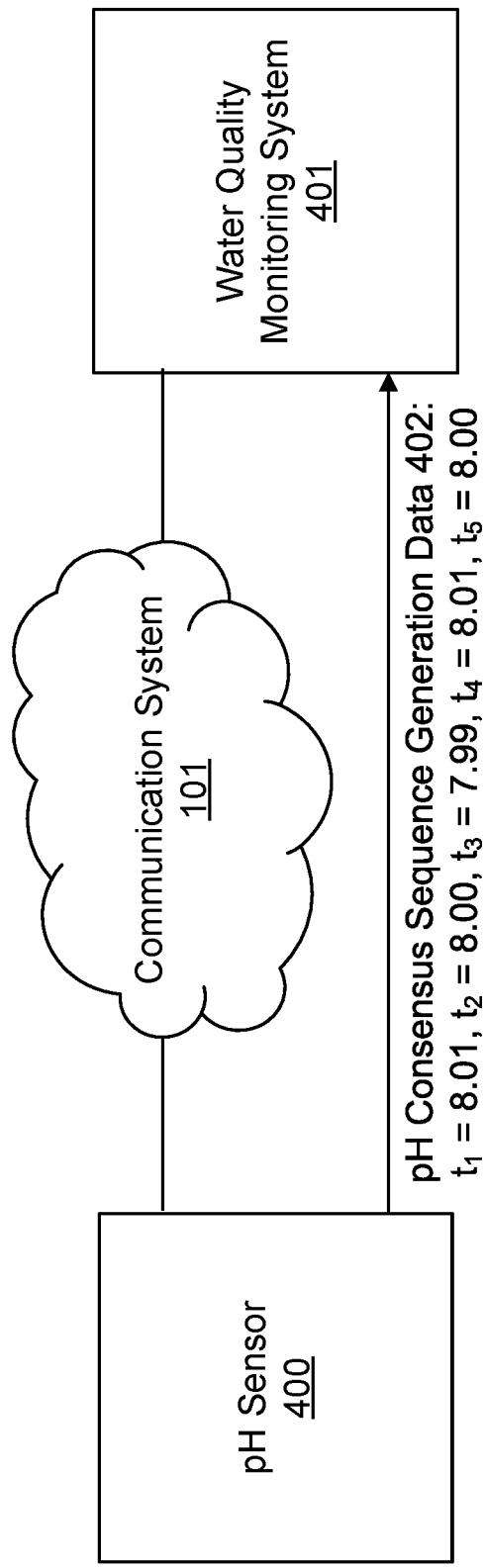
FIGS. 4A-4I show block diagrams illustrating a system in accordance with an embodiment over time.
Figure 4B:
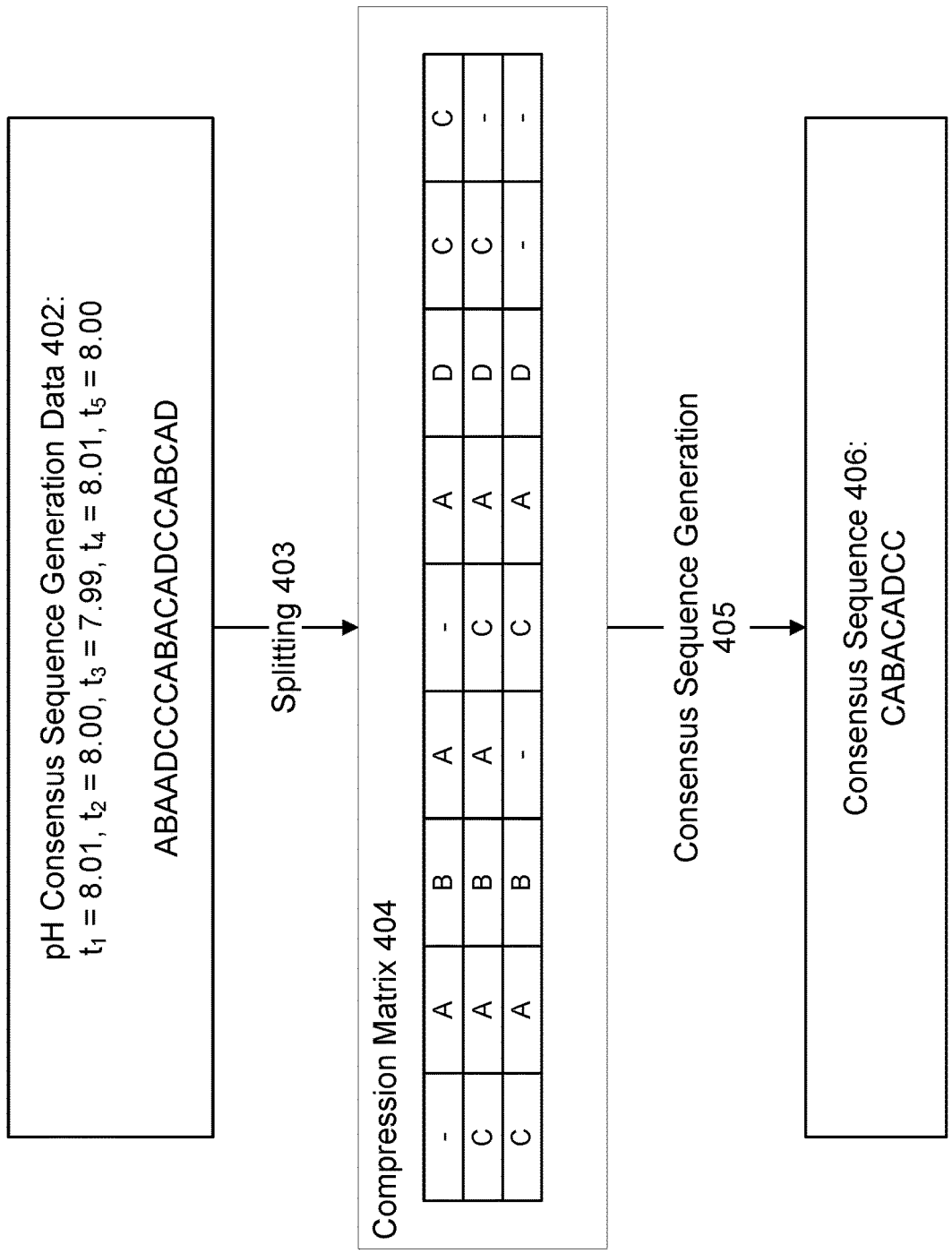

Turning to FIG. 4A, consider a scenario where pH sensor 400 collects pH consensus sequence generation data 402 from a water sample. pH consensus sequence generation data 402 may be collected at various time intervals (e.g., $t_1$, $t_2$, etc.) over the course of one hour and may include the following: $t_1$=8.01, $t_2$=8.00, $t_3$=7.99, $t_4$=8.01, $t_5$=8.00 (e.g., on a scale of 0 to 14 with a score of 7 indicating neutrality, scores below 7 indicating acidity, and scores above 7 indicating base conditions). Water quality monitoring system 401 may obtain pH consensus sequence generation data 402 for the purpose of generating a consensus sequence to facilitate data reduction as described below.

Water quality monitoring system 401 may generate a consensus sequence using pH consensus sequence generation data 402 from pH sensor 400. Turning to FIG. 4B, pH consensus sequence generation data 402 may be represented by a series of letters A-D, where each letter represents a number of bits. Therefore, the sequence ABAADCCCA-BACADCCABCAD may represent a bit-wise depiction of pH consensus sequence generation data 402. Water quality monitoring system 401 may perform a splitting 403 step to obtain sub-sequences of data. Sub-sequences of data may be segments of the sequence of data such as ABA or ADCC. Water quality monitoring system 401 may determine the length of the sub-sequences in order to align the sub-sequences in compression matrix 404.

Compression matrix 404 may display a method of aligning sub-sequences of data where the sub-sequences are of identical length. When the data may not be split into identical length segments, empty cells may be inserted to properly align the sub-sequences of data as shown in FIG. 4B. Sub-sequences of data may be aligned so that each column of compression matrix 404 holds one letter and/or an empty space. While FIG. 4B shows exact alignment of sub-sequences, misaligned data may be allowed in some scenarios in order to facilitate more efficient compression. In this scenario, some data may be lost during the compression (e.g., lossy compression) and an error threshold may indicate whether this loss may be acceptable.

Water quality monitoring system 401 may perform a consensus sequence generation 405 step in order to obtain consensus sequence 406. In order to obtain consensus sequence 406, the letter corresponding to each column of compression matrix 404 may be extracted and placed in sequential order. Therefore, consensus sequence 406 may include the following sequence of letters: CABACADCC. Consensus sequence 406 may be distributed to pH sensor 400 in order to facilitate reduced-size data transmission during data collection throughout the distributed environment as described below.

Figure 4C:
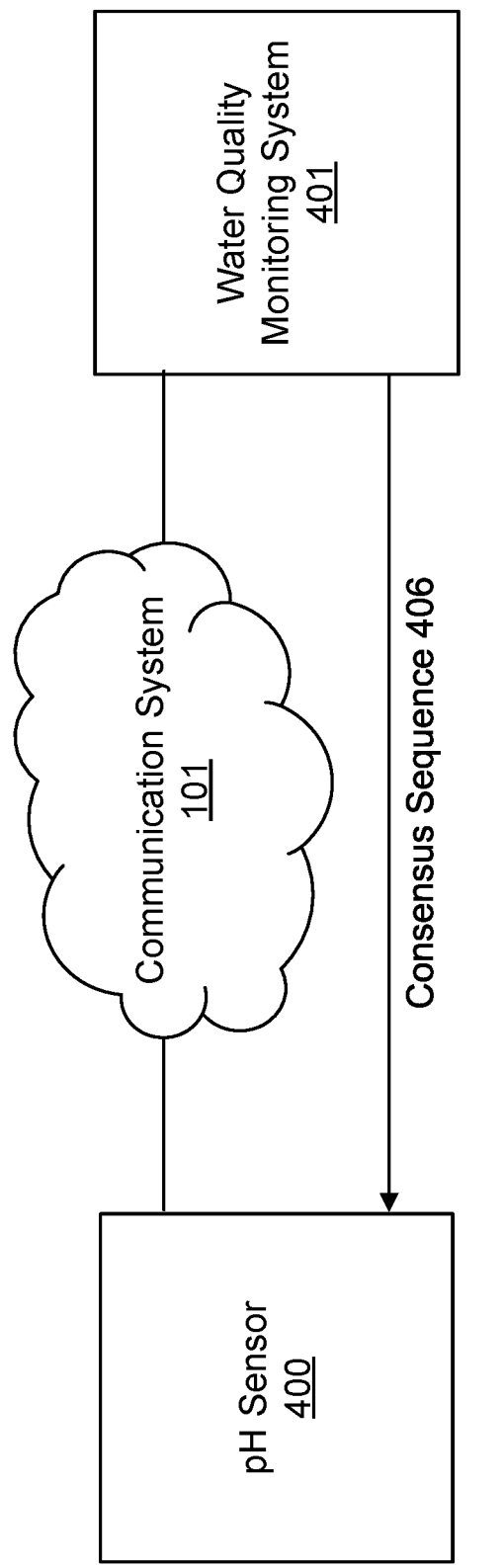
Figure 4D:
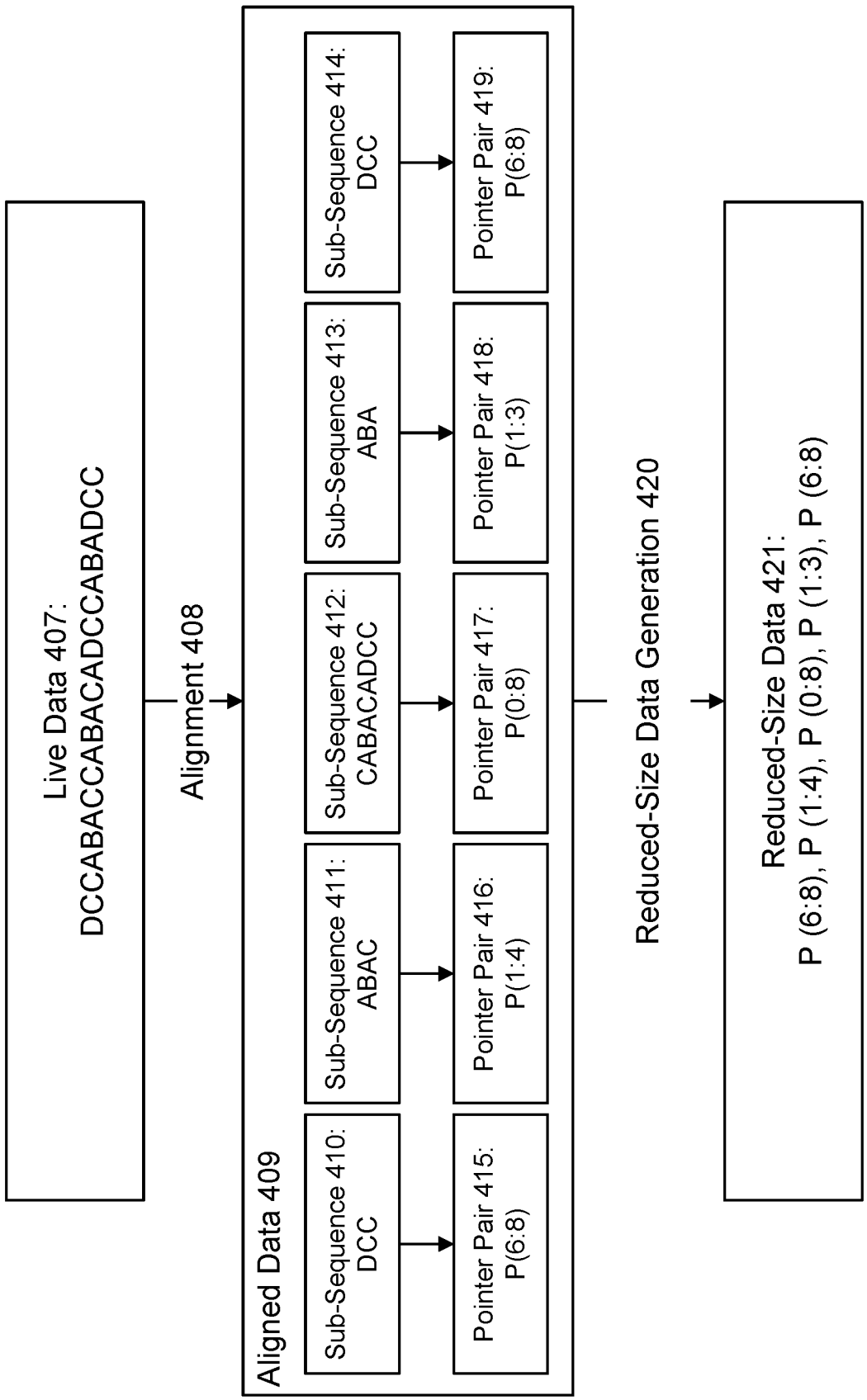

Turning to FIG. 4C, water quality monitoring system may distribute a copy of consensus sequence 406 to pH sensor 400. A second copy of consensus sequence 406 may remain at water quality monitoring system 401. Therefore, pH sensor 400 and water quality monitoring system 401 may share the ability to condense and reconstruct data based on consensus sequence 406. pH sensor may utilize consensus sequence 406 to condense data as described below.

Turning to FIG. 4D, pH sensor 400 may obtain reduced-size data using: (i) data based on measurements performed by pH sensor 400 and (ii) the consensus sequence obtained from water quality monitoring system 401. pH sensor 400 may collect live data 407 and live data 407 may be represented by the following sequence of letters: DCCABAC-CABACADCCABADCC. pH sensor 400 may perform an alignment 408 step in order to obtain aligned data 409. Alignment 408 may entail splitting live data 407 into sub-sequences (e.g., data segments) of data, each sub-sequence corresponding to at least a portion of consensus sequence 406.

For example, sub-sequence 410 may include the segment DCC, which may correspond to a portion of consensus sequence 406. Each letter in consensus sequence 406 may be labeled as a location in the consensus sequence, with the first letter corresponding to location 0 and the last letter corresponding to location 8. Therefore, sub-sequence 410 may correspond to a portion of consensus sequence 406 beginning at location 6 and ending at location 8. Consequently, sub-sequence 410 may be represented by pointer pair 415: P (6:8), with the first number indicating the starting location and the second number indicating the ending location on the consensus sequence. Similarly, sub-sequence 411 may include the following letters: ABAC. Sub-sequence 411 may be represented by pointer pair 416: P (1:4). This process may continue until each sub-sequence is represented by a pointer pair and/or may not be matched to the consensus sequence.

Following the generation of pointer pairs, pH sensor 400 may perform a reduced-size data generation 420 step in order to obtain reduced-size data 421. Reduced-size data 421 may include a series of pointer pairs and/or sub-sequences of data. For example, reduced-size data 421 may be represented as: P (6:8), P (1:4), P (0:8), P (1:3), P (6:8). By generating reduced-size data 421, pH sensor may transmit a condensed representation of live data 407 to water quality monitoring system 401 instead of transmitting the full data set. pH sensor 400 may conduct a further data reduction (e.g., data compression) step in order to obtain a packaged form of reduced-size data 421 prior to transmission (not shown). By doing so, data transmissions may be reduced during data collection and, therefore, network bandwidth may be conserved throughout the distributed environment. Water quality monitoring system 401 may reconstruct data based on measurements performed by pH sensor 400 as described below.

Figure 4E:
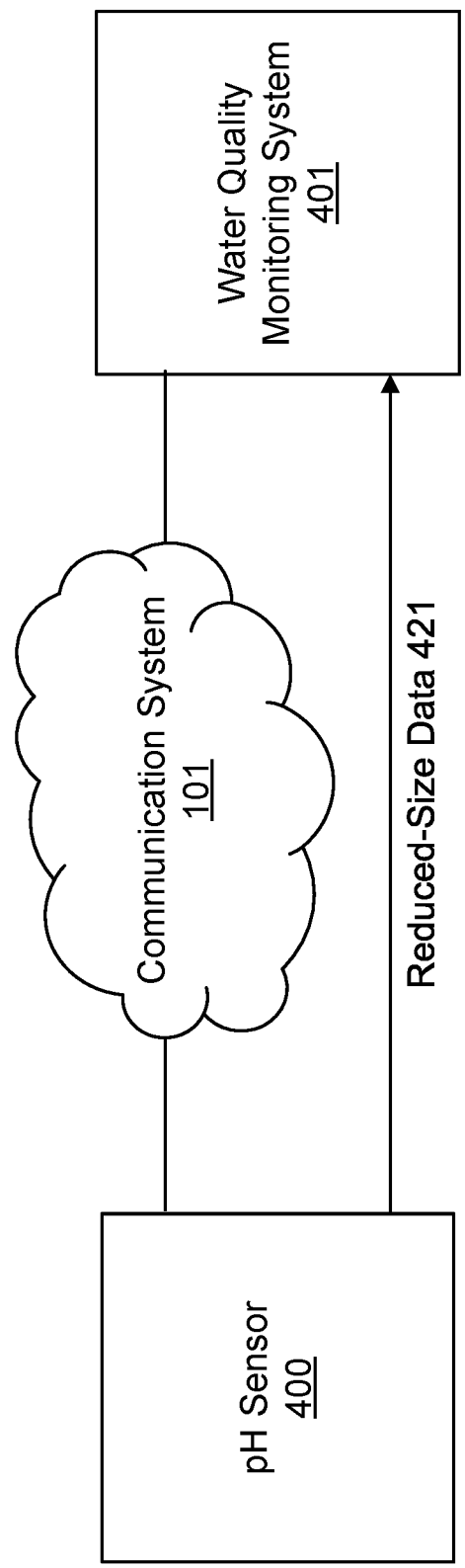
Figure 4F:
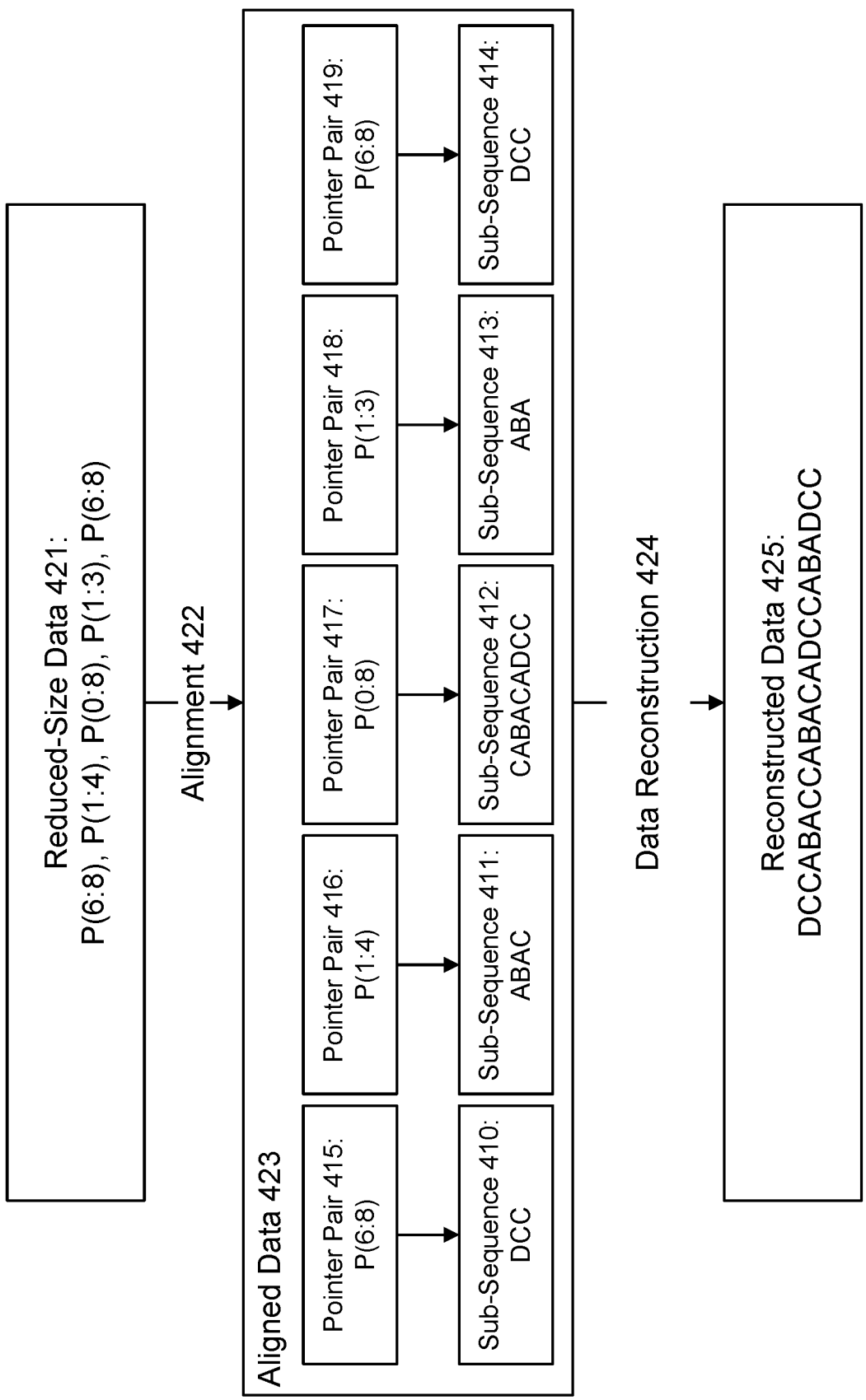
Figure 4G:
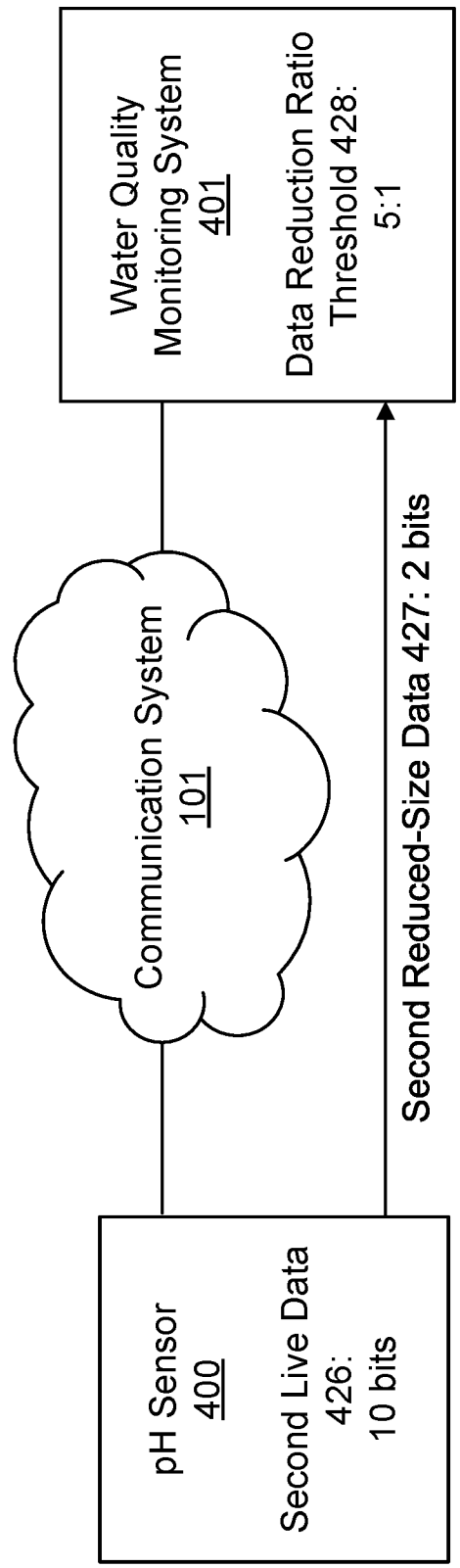
Figure 4H:
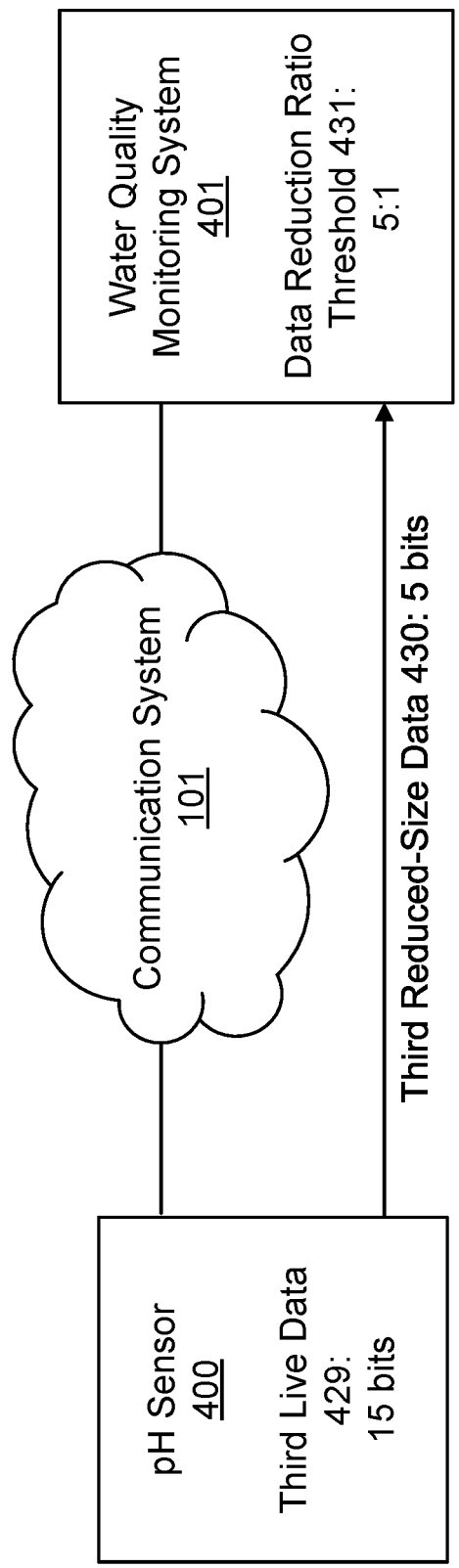
Figure 4I:
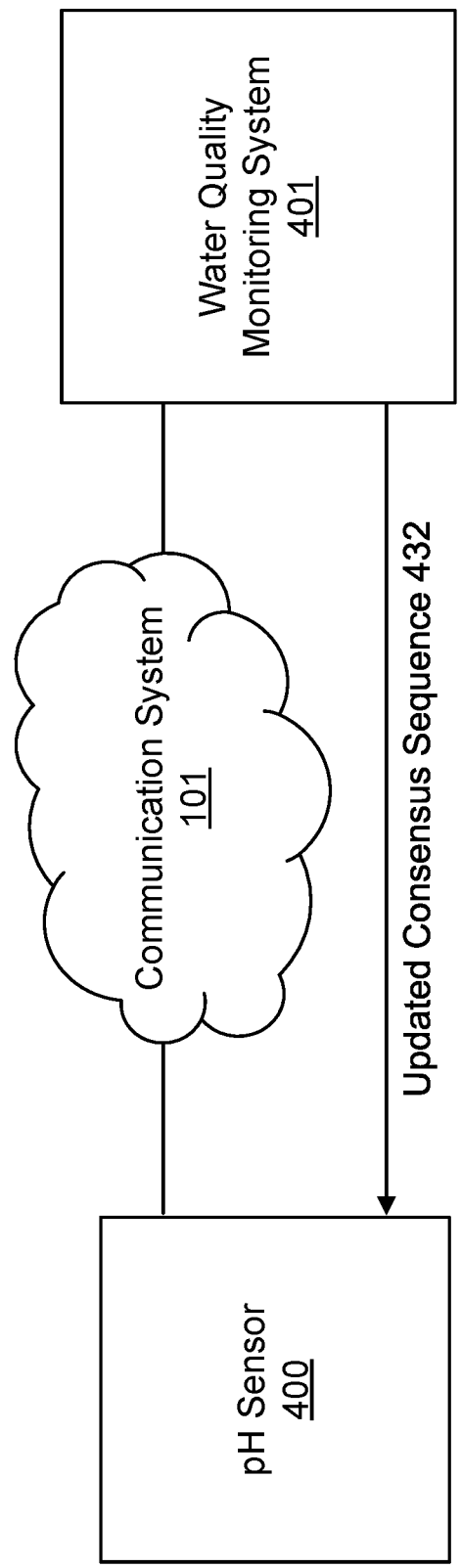

Turning to FIG. 4E, pH sensor 400 may transmit the packaged form of reduced-size data 421 to water quality monitoring system 401.

Turning to FIG. 4F, water quality monitoring system 401 may reconstruct data obtained via measurements performed by pH sensor 400 using: (i) reduced-size data 421 from pH sensor 400 and (ii) the copy of consensus sequence 406. Water quality monitoring system may first perform an extraction step to obtain the reduced-size data from the packaged form of the reduced-size data (not shown). Water quality monitoring system 401 may perform an alignment 422 step on reduced-size data 421 in order to obtain aligned data 423. Aligned data 423 may involve using the pointer pairs in reduced-size data 421 to identify sub-sequences of data. For example, pointer pair 415 may indicate that the first sub-sequence of data (e.g., sub-sequence 410) may contain the following letters: DCC. Similarly, pointer pair 416 may indicate that the second sub-sequence of data (e.g., sub-sequence 411) may contain the following letters: ABAC. This process may continue until all of pointer pairs 415-419 have been converted into sub-sequences 410-414.

Water quality monitoring system 401 may perform a data reconstruction 424 step to obtain reconstructed data 425. Reconstructed data 425 may be intended to match live data 407 and may be represented by the following sequence of letters: DCCABACCABACADCCABADCC. By doing so, water quality monitoring system 401 may be able to access measurements performed by pH sensor 400 without transmitting these measurements across communication system 101. Consequently, the bandwidth use of communication system 101 may be reduced by minimizing the size of information transmitted from pH sensor 400 to water quality monitoring system 401.

Turning to FIG. 4G, water quality monitoring system 401 may monitor the data reduction ratio throughout the distributed environment. For example, a data reduction ratio threshold 428 of 5:1 may be established. Therefore, the ratio of bits in live data sets obtained by pH sensor 400 to bits in the packaged form of the reduced-size data obtained by pH sensor 400 must be 5:1 or higher to be considered sufficient. Second live data 426 may be obtained by pH sensor 400 and may contain 10 bits of information. pH sensor may obtain a packaged form of reduced-size data 427 containing 2 bits of information. Therefore, the data reduction ratio for this data transmission may be 5:1. As this ratio meets the data reduction ratio threshold, pH sensor 400 may be sufficiently reducing the size of data transmissions.

Turning to FIG. 4H, water quality monitoring system 401 may establish the same data reduction ratio threshold of 5:1. pH sensor 400 may obtain third live data 429 containing 15 bits of information. pH sensor 400 may obtain a packaged form of third reduced-size data 430 containing 5 bits of information. Therefore, the data reduction ratio may be 3:1 and this ratio may fall below the data reduction ratio threshold of 5:1. Consequently, pH sensor 400 may be insufficiently reducing the size of data transmissions.

If pH sensor is found to be insufficiently reducing the size of data transmissions, water quality monitoring system 401 may update the consensus sequence used to generate the reduced data. Turning to FIG. 4I, water quality monitoring system 401 may obtain updated consensus sequence 432 and distribute a copy of updated consensus sequence 432 to pH sensor 400. Updated consensus sequence 432 may be based on live data obtained from pH sensor 400, at least a portion of consensus sequence 406, and/or at least a portion of data reconstructed by water quality monitoring system 401. Water quality monitoring system 401 may distribute updated consensus sequence 432 to pH sensor 400 in order to facilitate more efficient data reduction by pH sensor 400 and, therefore, reduce the size of data transmitted over communication system 101. By doing so, network bandwidth may be conserved and power consumption by pH sensor 400 due to data transmissions may be reduced.

Figure 5:
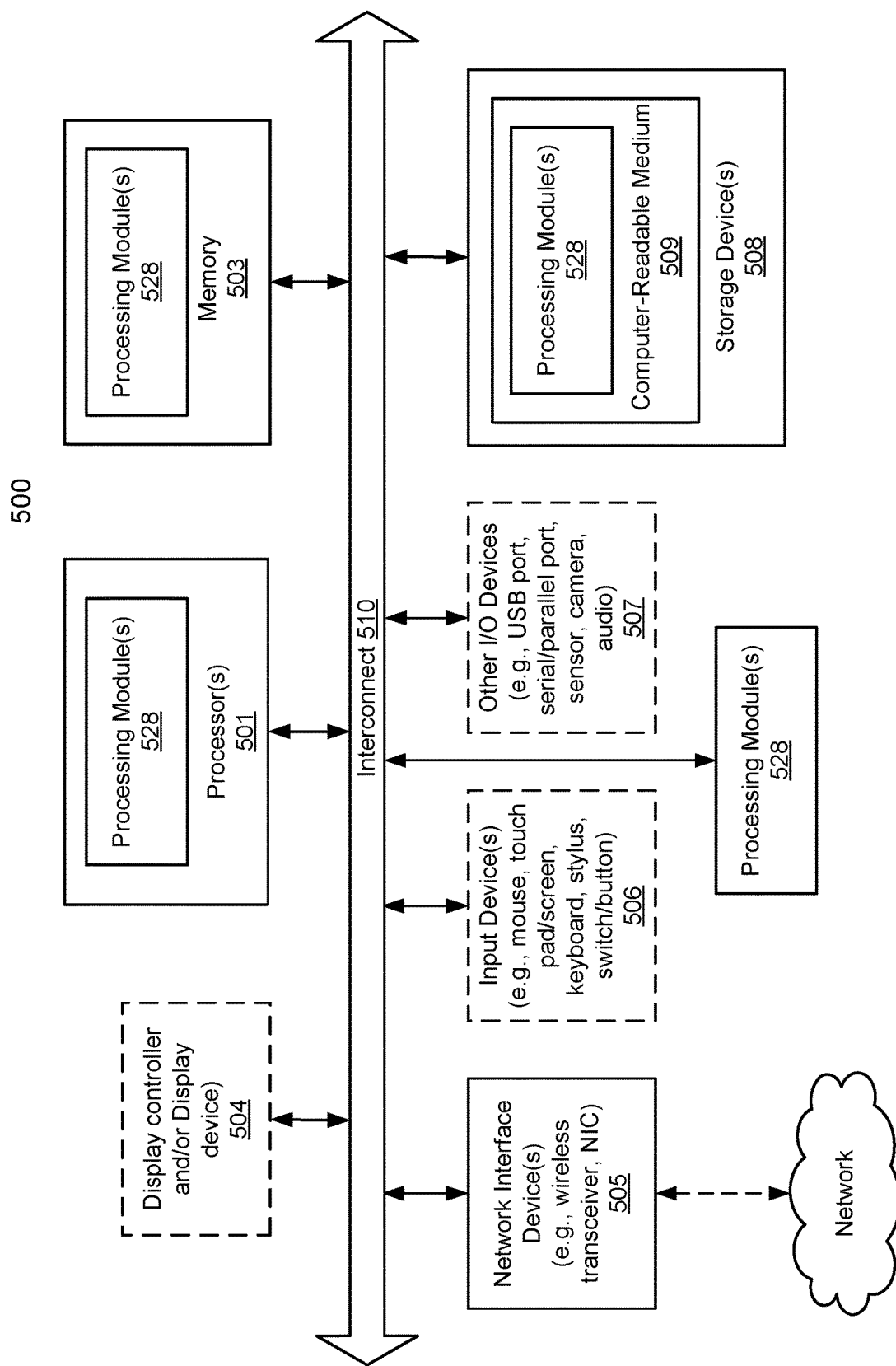
FIG. 5 shows a block diagram illustrating a data processing system in accordance with an embodiment.

Any of the components illustrated in FIGS. 1-4I may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data collection in a distributed environment where data is collected in a data aggregator of the distributed environment and from a data collector operably connected to the data aggregator via a communication system, the method comprising:
   obtaining, by the data aggregator, reduced-size data from the data collector, the reduced-size data being based on:
      the data obtained via a measurement performed by the data collector, and
      a consensus sequence generated by the data aggregator;
   reconstructing, by the data aggregator, the data using the reduced-size data and the consensus sequence, the reconstructed data being intended to match the data obtained via the measurement performed by the data collector within an error threshold; and
   performing an action set based at least in part on the reconstructed data, the action set comprising one or more actions to be performed based on the data obtained by the measurement performed by the data collector, and while the data aggregator does not have access to the data obtained by the data collector.

2. The method of claim 1, further comprising:
   obtaining, by the data aggregator, the consensus sequence, the consensus sequence being based on:
      consensus sequence generation data obtained via measurements performed by the data collector, and
      a compression matrix obtained via splitting the consensus sequence generation data into sub-sequences of data.

3. The method of claim 2, wherein the consensus sequence generation data is obtained using a sensor that measures a characteristic of an ambient environment.

4. The method of claim 1, wherein obtaining the reduced-size data comprises:
   receiving via a communication system a packaged form of the reduced-size data, the packaged form being compliant with a communication scheme employed by the communication system; and
   extracting the reduced-size data from the packaged form of the reduced-size data.

5. The method of claim 4, wherein the packaged form of the reduced-size data is received via a capacity-constrained downlink of the communication system.

6. The method of claim 5, further comprising:
   obtaining, by the data aggregator, the consensus sequence and providing the consensus sequence to the data collector via an uplink of the communication system that is not capacity-constrained prior to the reduced-size data being obtained from the data collector.

7. The method of claim 1, wherein reconstructing the data using the reduced-size data and the consensus sequence comprises:
   determining, by the data aggregator, that the reduced-size data was generated using the consensus sequence; and
   based on the determining, aggregating copies of portions of the consensus sequence together based on the consensus sequence to obtain the reconstructed data.

8. The method of claim 7, wherein the reconstructed data is imperfectly reconstructed.

9. The method of claim 1, further comprising:
   providing, by the data aggregator and to the data collector, the consensus sequence prior to obtaining the reduced-size data.

10. The method of claim 1, wherein the data aggregator and data collector are separate devices that are geographically separated from one another and that operate independently from one another.

11. The method of claim 1, further comprising:
   updating the consensus sequence in response to a data reduction ratio of the reduced-size data falling below a threshold.

12. The method of claim 1, further comprising:
   updating the consensus sequence in response to measurements performed by the data collector drifting over time.

13. A non-transitory machine-readable medium having instructions stored therein, which when executed by a processor, cause the processor to perform operations for managing data collection in a distributed environment where data is collected in a data aggregator of the distributed environment and from a data collector operably connected to the data aggregator via a communication system, the operations comprising:
- obtaining, by the data aggregator, reduced-size data from the data collector, the reduced-size data being based on:
  - the data obtained via a measurement performed by the data collector, and
  - a consensus sequence generated by the data aggregator;
- reconstructing, by the data aggregator, the data using the reduced-size data and the consensus sequence, the reconstructed data being intended to match the data obtained via the measurement performed by the data collector within an error threshold; and
- performing an action set based at least in part on the reconstructed data, the action set comprising one or more actions to be performed based on the data obtained by the measurement performed by the data collector, and while the data aggregator does not have access to the data obtained by the data collector.

14. The non-transitory machine-readable medium of claim 13, wherein the operations further comprise:
- obtaining, by the data aggregator, the consensus sequence, the consensus sequence being based on:
  - consensus sequence generation data obtained via measurements performed by the data collector, and
  - a compression matrix obtained via splitting the consensus sequence generation data into sub-sequences of data.

15. The non-transitory machine-readable medium of claim 13, wherein obtaining the reduced-size data comprises:
- receiving via a communication system a packaged form of the reduced-size data, the packaged form being compliant with a communication scheme employed by the communication system; and
- extracting the reduced-size data from the packaged form of the reduced-size data.

16. The non-transitory machine-readable medium of claim 15, wherein the packaged form of the reduced-size data is received via a capacity-constrained downlink of the communication system.

17. A data aggregator, comprising:
- a processor; and
- a memory coupled to the processor to store instructions, which when executed by the processor, cause the processor to perform operations for managing data collection in a distributed environment where data is collected in the data aggregator of the distributed environment and from a data collector operably connected to the data aggregator via a communication system, the operations comprising:
  - obtaining, by the data aggregator, reduced-size data from the data collector, the reduced-size data being based on:
    - the data obtained via a measurement performed by the data collector, and
    - a consensus sequence generated by the data aggregator;
  - reconstructing, by the data aggregator, the data using the reduced-size data and the consensus sequence, the reconstructed data being intended to match the data obtained via the measurement performed by the data collector within an error threshold; and
  - performing an action set based at least in part on the reconstructed data, the action set comprising one or more actions to be performed based on the data obtained by the measurement performed by the data collector, and while the data aggregator does not have access to the data obtained by the data collector.

18. The data aggregator of claim 17, wherein the operations further comprise:
- obtaining, by the data aggregator, the consensus sequence, the consensus sequence being based on:
  - consensus sequence generation data obtained via measurements performed by the data collector, and
  - a compression matrix obtained via splitting the consensus sequence generation data into sub-sequences of data.

19. The data aggregator of claim 17, wherein obtaining the reduced-size data comprises:
- receiving via a communication system a packaged form of the reduced-size data, the packaged form being compliant with a communication scheme employed by the communication system; and
- extracting the reduced-size data from the packaged form of the reduced-size data.

20. The data aggregator of claim 19, wherein the packaged form of the reduced-size data is received via a capacity-constrained downlink of the communication system.

* * * * *